(12) United States Patent
O'Donnell

(10) Patent No.: US 12,195,055 B2
(45) Date of Patent: Jan. 14, 2025

(54) VEHICLE FOR TRANSPORTING CARGO

(71) Applicant: Barry Clive O'Donnell, Porirua (NZ)

(72) Inventor: Barry Clive O'Donnell, Porirua (NZ)

(*) Notice: Subject to any disclaimer, the term of this patent is extended or adjusted under 35 U.S.C. 154(b) by 939 days.

(21) Appl. No.: 17/284,722

(22) PCT Filed: Oct. 18, 2019

(86) PCT No.: PCT/NZ2019/050137
§ 371 (c)(1),
(2) Date: Apr. 12, 2021

(87) PCT Pub. No.: WO2020/080959
PCT Pub. Date: Apr. 23, 2020

(65) Prior Publication Data
US 2021/0316766 A1    Oct. 14, 2021

(30) Foreign Application Priority Data
Oct. 18, 2018 (NZ) .................................. 747427

(51) Int. Cl.
| | |
|---|---|
| *B61D 3/00* | (2006.01) |
| *B60P 3/41* | (2006.01) |
| *B60P 3/42* | (2006.01) |
| *B61D 3/08* | (2006.01) |
| *B62D 33/02* | (2006.01) |

(Continued)

(52) U.S. Cl.
CPC ............... *B61D 3/005* (2013.01); *B60P 3/41* (2013.01); *B60P 3/42* (2013.01); *B61D 3/08* (2013.01); *B62D 33/0215* (2013.01); *B60P 7/13* (2013.01); *B61D 45/007* (2013.01)

(58) Field of Classification Search
CPC ........ B61D 3/005; B61D 3/08; B61D 45/007; B60P 3/41; B60P 3/42; B60P 7/13; B62D 33/0215
See application file for complete search history.

(56) References Cited

U.S. PATENT DOCUMENTS

| | | | |
|---|---|---|---|
| 990,147 A * | 4/1911 | Kobler ..................... | B61D 3/08 105/272 |
| 2,071,620 A | 12/1934 | Fitch | |

(Continued)

FOREIGN PATENT DOCUMENTS

| | | | |
|---|---|---|---|
| CN | 203485922 U | | 3/2014 |
| CN | 206494016 U | * | 9/2017 |

(Continued)

OTHER PUBLICATIONS

Railway Gazette International, Sep. 2016, pp. 87-90, "Harnessing technology to revive wagonload".

(Continued)

*Primary Examiner* — Scott A Browne
(74) *Attorney, Agent, or Firm* — LADAS & PARRY LLP

(57) ABSTRACT

A vehicle for transporting cargo has a deck and a group of cradles. Each cradle in the group is pivotable relative to the deck between an extended configuration in which the cradles extend at a transverse angle relative to the deck, and a collapsed configuration in which the cradles are substantially flush with the deck. The vehicle has an actuator adapted to concurrently pivot two or more cradles in the group between the extended configuration and the collapsed configuration.

20 Claims, 17 Drawing Sheets

(51) Int. Cl.
*B60P 7/13* (2006.01)
*B61D 45/00* (2006.01)

(56) References Cited

U.S. PATENT DOCUMENTS

| | | | | |
|---|---|---|---|---|
| 3,547,049 | A | * | 12/1970 | Sanders .................. B61D 3/18 410/27 |
| 3,550,537 | A | | 12/1970 | Holt |
| 4,944,232 | A | * | 7/1990 | Schlaeger .............. B61D 3/184 410/49 |
| 4,966,085 | A | | 10/1990 | Howe |
| 6,368,035 | B1 | * | 4/2002 | Recupido ................ B61D 3/04 410/27 |
| 8,262,328 | B2 | * | 9/2012 | Crane .................. B65D 88/129 410/46 |
| 8,967,943 | B2 | | 3/2015 | Drott et al. |
| 2002/0000934 | A1 | | 1/2002 | Clive-Smith |
| 2002/0009345 | A1 | * | 1/2002 | Clive-Smith ........ B65D 88/522 410/32 |
| 2013/0017094 | A1 | | 1/2013 | Drott et al. |
| 2013/0170941 | A1 | | 7/2013 | Drott et al. |
| 2016/0278516 | A1 | | 9/2016 | Lawrence |

FOREIGN PATENT DOCUMENTS

| | | |
|---|---|---|
| DE | 2636057 A1 | 2/1978 |
| DE | 3509316 A1 | 9/1986 |
| DE | 102009004090 A1 | 7/2010 |
| EP | 0557215 A1 | 8/1993 |
| EP | 1116642 A1 | 7/2001 |
| EP | 1 462 346 B1 | 8/2008 |
| EP | 2 204 311 B1 | 4/2012 |
| EP | 2998180 A1 | 3/2016 |
| GB | 1 455 267 A | 11/1976 |
| GB | 2415957 | 1/2006 |
| JP | U-S53-59208 | 5/1978 |
| RU | 62073 U1 | 3/2007 |
| RU | 2535969 | 12/2014 |
| WO | 2006/005920 A1 | 1/2006 |

OTHER PUBLICATIONS

DE 102009004090 A1 _ English Translation.
ISR for International Application No. PCT/NZ2019/050137.
Written Opinion for International Application No. PCT/NZ2019/050137.
EP 2 204 311 B1 _ English Translation.
EP 1 462 346 B1 _ English Translation.
Chilean Second Examination Report dated Feb. 2, 2023.
Japanese First Examination Report dated Feb. 13, 2023.
Taiwanese First Exaamination Report dated Feb. 20, 2023.
Taiwanese Exam Report issued on copending application TW108137520 dated Jun. 28, 2024.

* cited by examiner

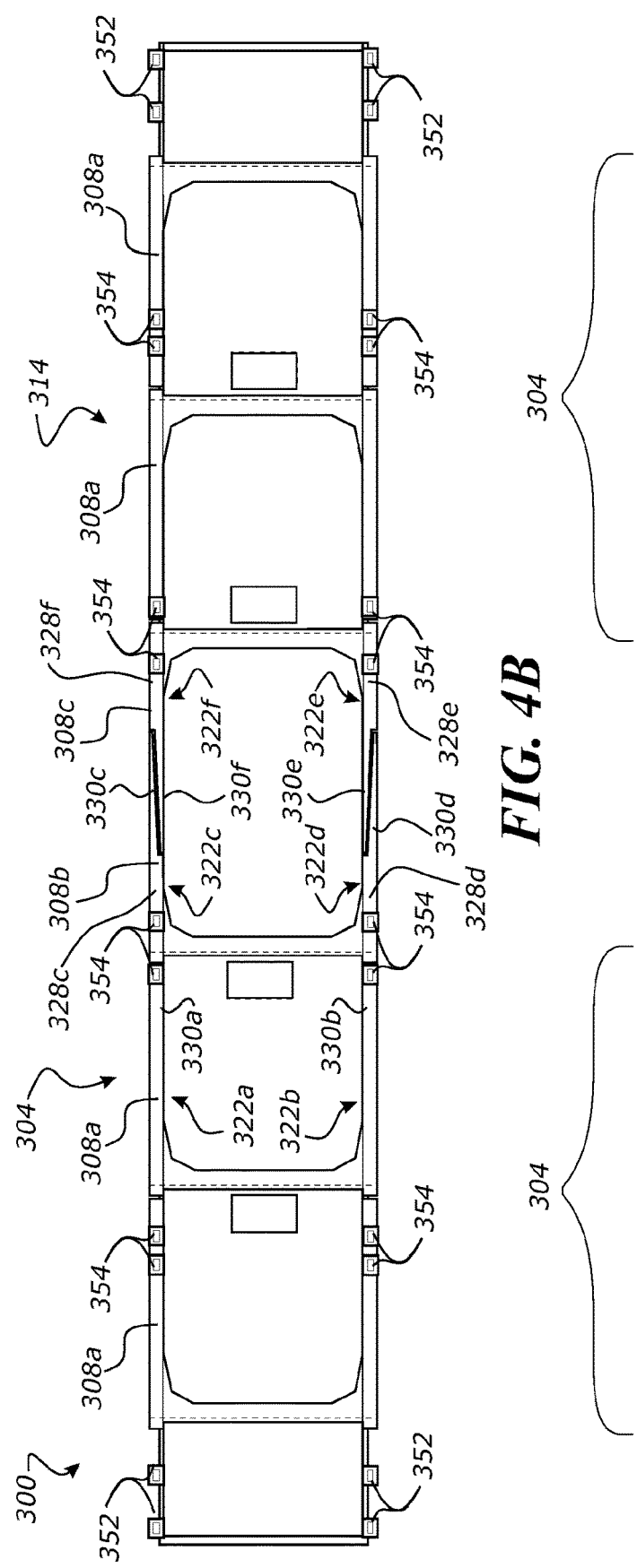
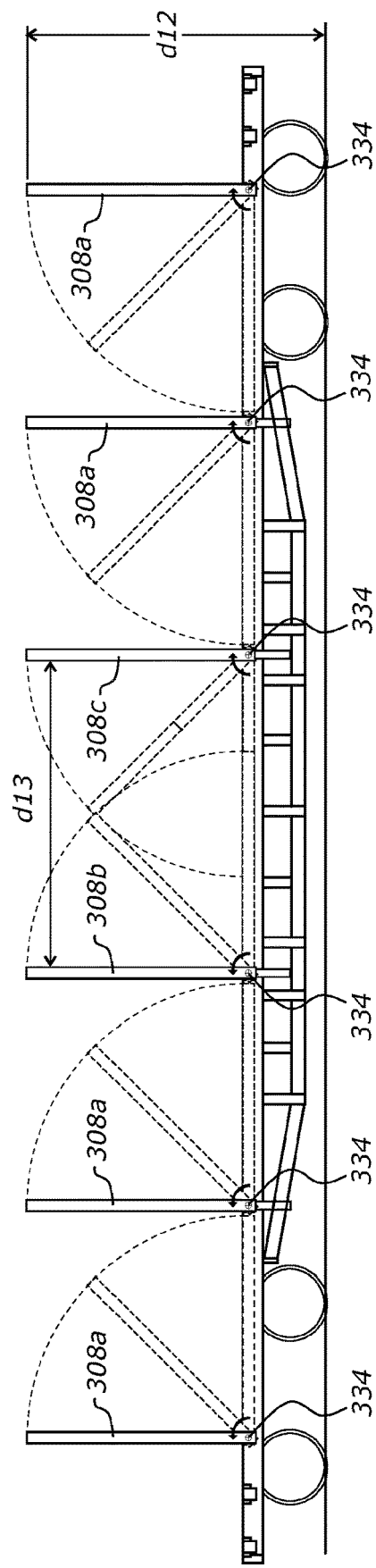
FIG. 4B
FIG. 4C

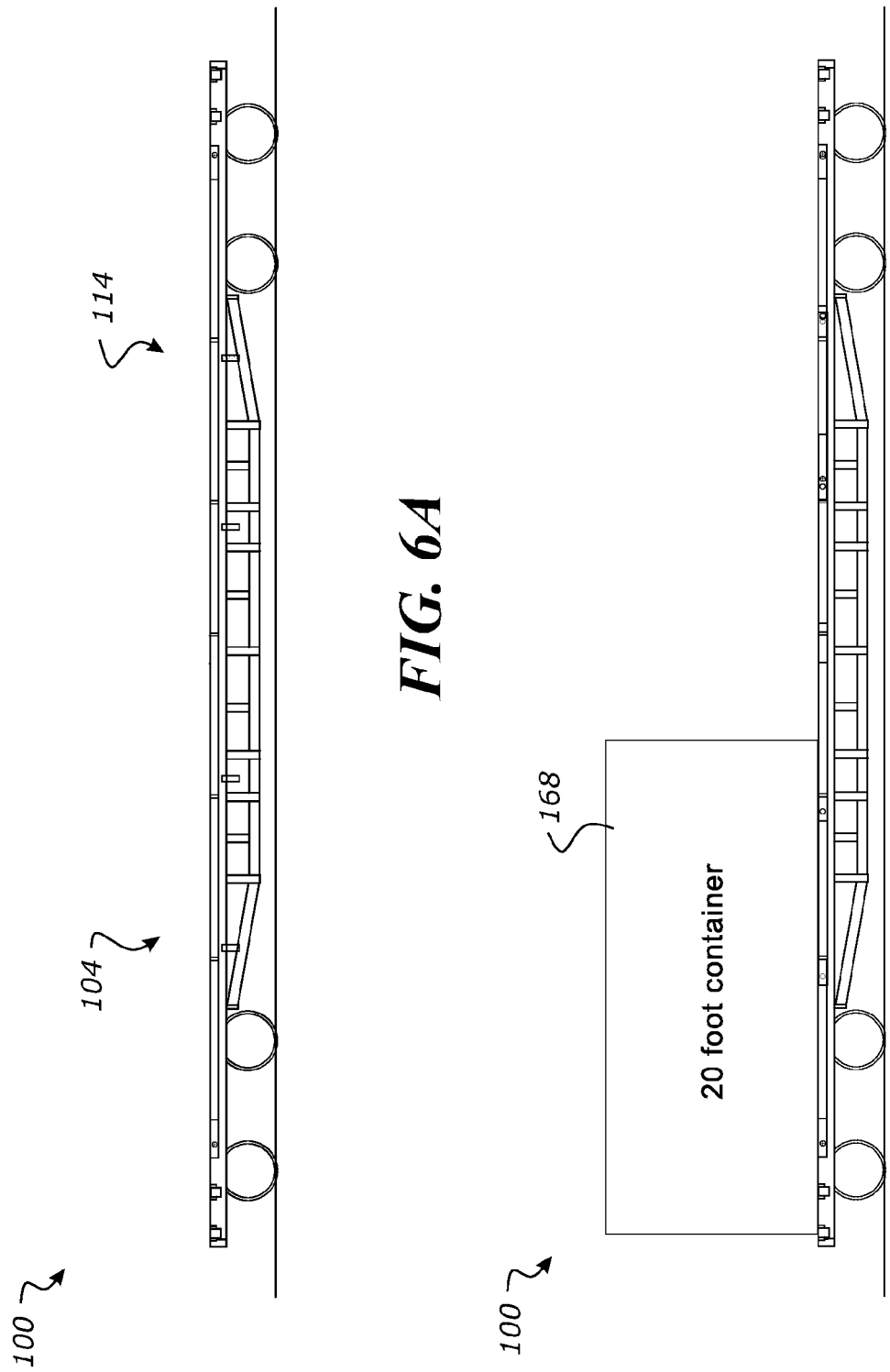

VEHICLE FOR TRANSPORTING CARGO

RELATED APPLICATION

This application is an application under 35 U.S.C. 371 of International Application No. PCT/NZ2019/050137 filed on 18 Oct. 2019, which claims the benefit of NZ Application No.: 747427 filed 18 Oct. 2018, the disclosures of which are incorporated in their entirety by reference herein.

FIELD OF THE INVENTION

This invention relates to a vehicle for transporting cargo.

BACKGROUND

Logs from forestry operations are often transported over long distances. Over land, logs are typically transported by vehicles, such as wagons towed by trains or trucks, that are specifically configured for carrying logs. These vehicles typically have vertically extending stanchions that retain a plurality of logs on the vehicle.

Known vehicles cannot readily carry other types of cargo. After carrying logs to a destination, it is often necessary for vehicles to be empty on the return journey. This can seem inefficient, especially if there are other types of cargo at the destination that could be transported on the return journey.

It is an object of at least preferred embodiments of the present invention to provide a vehicle that can be used to carry different types of cargo, and/or to at least provide the public with a useful alternative.

SUMMARY OF THE INVENTION

In accordance with a first aspect of the invention, there is provided a vehicle for transporting cargo, comprising: a deck; a group of cradles, each cradle in the group being pivotable relative to the deck between an extended configuration in which the cradles extend at a transverse angle relative to the deck, and a collapsed configuration in which the cradles are substantially flush with the deck; and an actuator adapted to concurrently pivot two or more cradles in the group between the extended configuration and the collapsed configuration.

The 'term comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

In an embodiment, the group of cradles composes at least two cradles. In an embodiment, the group of cradles comprises at least three cradles.

In an embodiment the group is a first group and the actuator is a first actuator, the vehicle further comprising: a second group of cradles, each cradle in the second group being pivotable relative to the deck between an extended configuration in which the cradles extend at a transverse angle relative to the deck, and a collapsed configuration in which the cradles are substantially flush with the deck; and a second actuator adapted to concurrently pivot two or more cradles in the second group between the extended configuration and the collapsed configuration.

In an embodiment, the second group of cradles comprises at least two cradles. In an embodiment, the second group of cradles comprises at least three cradles.

In an embodiment, at least one cradle comprises a base and a first outwardly extending stanchion at or near a first end of the base. In an embodiment, the at least one cradle comprises a second outwardly extending stanchion at or near a second end of the base.

In an embodiment, free ends of the stanchion(s) of at least one cradle are adapted to nest with an adjacent cradle when the cradles are in the collapsed configuration. In an embodiment, the free ends of at least some of the stanchions are tapered.

In an embodiment, the vehicle is adapted to carry elongate objects when the cradles are in the extended configuration. In an embodiment, the vehicle is adapted to carry an intermodal container when the cradles are in the collapsed configuration.

In an embodiment, at least one cradle comprises fittings for securing an intermodal container to the vehicle. In an embodiment, the deck comprises fittings for securing an intermodal container to the vehicle.

In an embodiment, at least one cradle further comprises a biasing mechanism for biasing the cradle towards the extended configuration. In an embodiment, the biasing mechanism comprises a counterweight.

In an embodiment, the actuator(s) comprise(s) a worm drive. In an embodiment, the actuator(s) is/are manually operable. In an embodiment, the actuator(s) is/are pneumatically operable. In an embodiment, the actuator(s) is/are hydraulically operable.

In an embodiment, the vehicle is a train or a wagon adapted for use with a train. In an embodiment, the cradles are shaped and dimensioned to fit within a rail loading gauge in the extended configuration, the rail loading gauge having a load platform 910 mm above a rail level, vertical sides extending above the vehicle load platform spaced 1415 mm on either side of a centreline, a horizontal ceiling 3800 mm above the rail level, and angled portions connecting the sides and the ceiling, the angled portions extending from 750 mm from the centreline to 2900 mm above the rail level.

In an embodiment, the vehicle is a truck or a wagon adapted for use with a truck.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which:

FIG. 4B shows a top view of the third embodiment wagon with the cradles in the collapsed configuration;

FIG. 4C shows a side view of the third embodiment wagon with the cradles pivoting from the collapsed configuration to the extended configuration;

FIGS. 6A-6H show various cargo arrangements that can be transported by the wagon;

FIG. 9 is a perspective view of a group of cradles and an exemplary actuator for.

DETAILED DESCRIPTION OF A PREFERRED EMBODIMENT

Figure 1A:
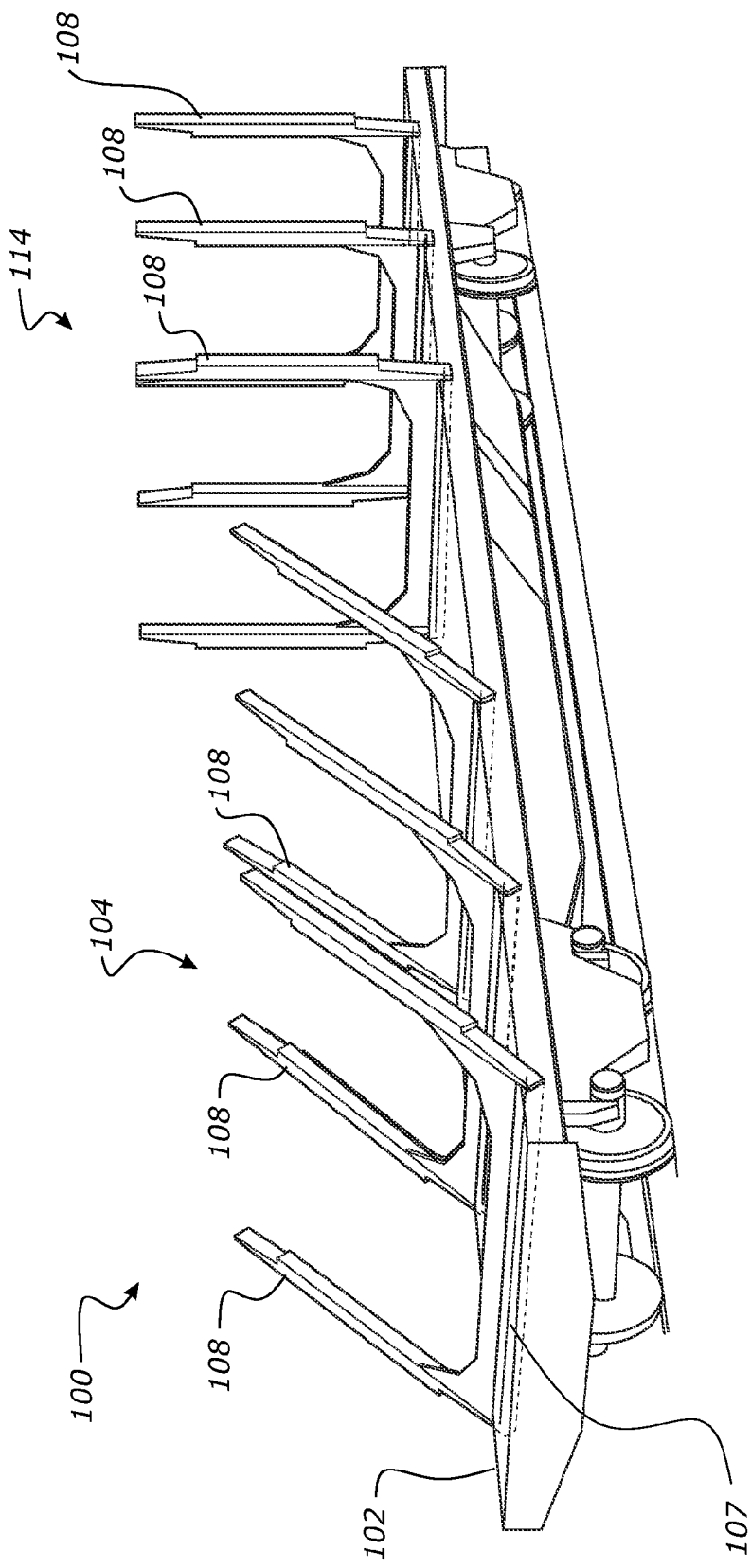
FIG. 1A shows a schematic perspective view of a railway wagon for transporting cargo with a first group of cradles in an intermediate position between an extended configuration and a collapsed configuration, and a second group of cradles in the extended configuration.

FIG. 1A shows a vehicle for transporting cargo. In the embodiment shown, the vehicle is a wagon 100, specifically a train wagon, for transporting cargo. The vehicle may be another types of vehicle, such as a truck, where the cargo is transported on the body of the truck.

Figure 5A:
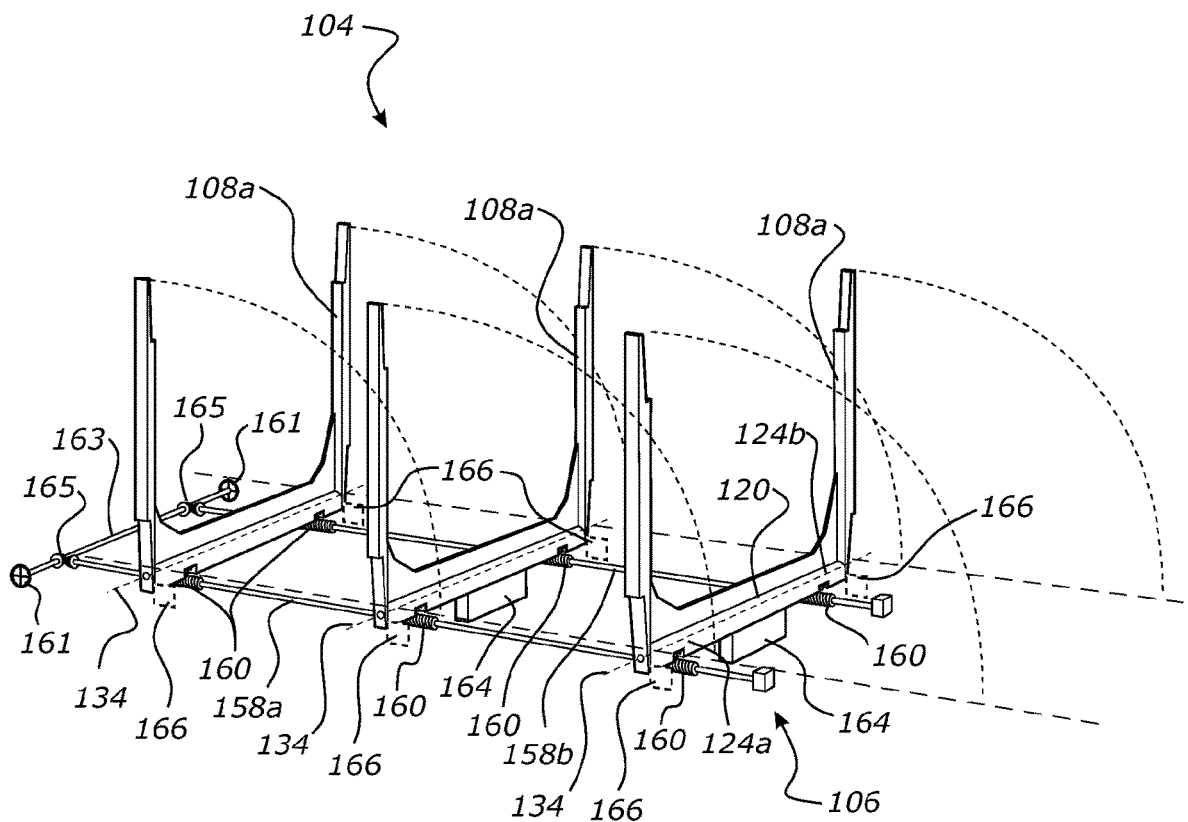
FIG. 5A shows a perspective view of an exemplary actuator.
Figure 5B:
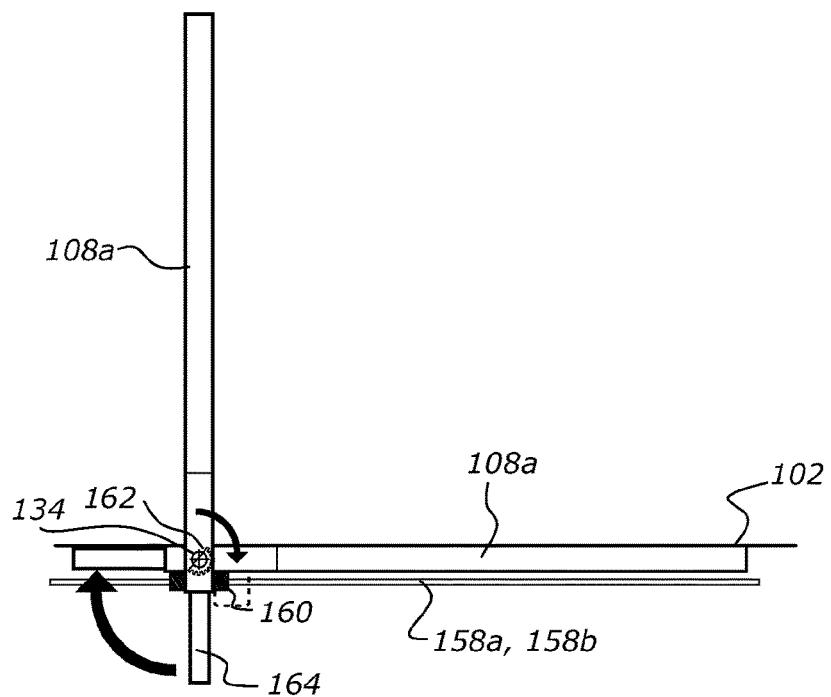
FIG. 5B shows a side view of a portion of the exemplary actuator of FIG. 5A.

The wagon 100 has a deck 102, a group of cradles 104, and an actuator 106 (see FIGS. 5A and 5B). The deck 102 has an upper surface 107. The upper surface 107 is a substantially flat surface. The upper surface 107 may be discontinuous. For example, the upper surface 107 has gaps or recesses (not illustrated) for receiving cradles 108.

Each cradle 108 in the group 104 is pivotable relative to the deck 102 between an extended configuration in which the cradles 108 extend at a transverse angle relative to the deck 102, and a collapsed configuration in which the cradles 108 are substantially flush with the deck 102. In the collapsed configuration, the cradles 108 are substantially flush with the upper surface 107 of the deck 102.

The actuator 106 is adapted to concurrently pivot two or more cradles 108 in the group 104 between the extended configuration and the collapsed configuration. That is, the cradles 108 in the group 104 pivot at the same time. At any point in time, the two or more cradles 108 in the group 104 will extend at the same angle relative to the deck 102. In FIG. 1A, the group 104 is shown at an intermediate position between the extended configuration and the collapsed configuration. The cradles 108 are adapted to pivot back and forth between the extended configuration and the collapsed configuration.

The group of cradles 104 comprises at least two cradles 108. In the embodiment shown, the group of cradles 104 comprises three cradles 108. In alternative embodiments, the group of cradles 104 comprises more than three cradles 108. For example, the group of cradles 104 may comprise four, five, six or more cradles 108.

In the embodiment shown in FIGS. 1A, 5A and 5B, the group 104 is a first group 104 and the actuator 106 is a first actuator 106. The wagon 100 has a second group of cradles 114, and a second actuator 106. The second group of cradles 114 has the same features and functionality as the first group of cradles 104. Each cradle 108 in the second group 114 is pivotable relative to the deck 102 between an extended configuration in which the cradles 114 extend at a transverse angle relative to the deck 102, and a collapsed configuration in which the cradles are substantially flush with the deck 102. The second actuator 106 is adapted to concurrently pivot two or more cradles 108 in the second group 114 between the extended configuration and the collapsed configuration.

The second group of cradles 114 comprises at least two cradles 108. In the embodiment shown, the second group of cradles 114 comprises three cradles 108. In an embodiment, the second group of cradles 114 comprises at least three cradles 108. For example, the second group of cradles 114 may comprise four, five, six or more cradles 108.

Figure 1B:
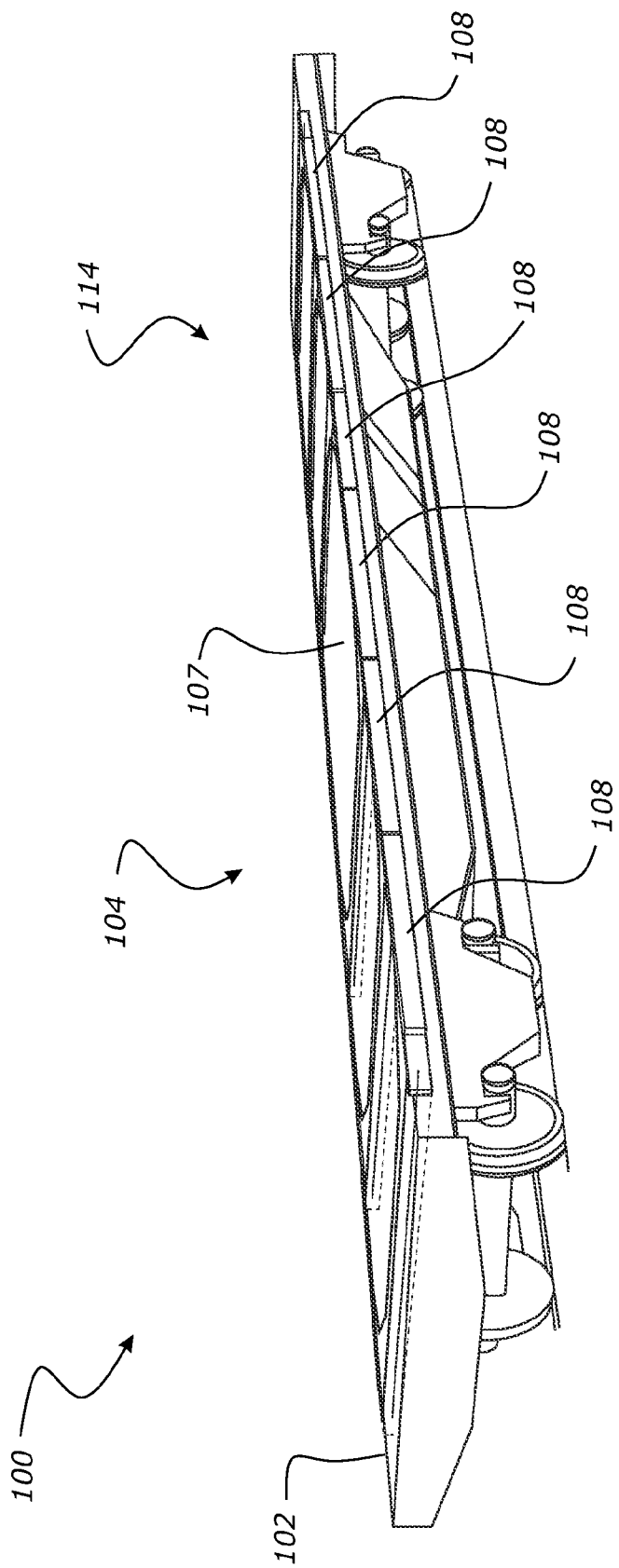
FIG. 1B shows the wagon of FIG. 1A, with all of the cradles in the collapsed configuration.

FIG. 1B shows the cradles 108 of the first group 104 and the second group 114 in the collapsed configuration. The cradles 108 are substantially flush with the deck 102 in the collapsed configuration, when a cradle 108 is in the collapsed configuration, substantially all the cradle 108 is located at or below the upper surface 107 of the deck 102. This provides a deck 102 that is substantially free from obstructions and allows a substantially flat object to be earned on the deck 102. The surface of each cradle 108 may form part of a load carrying surface with the upper surface 107 of the deck 102. In an alternative embodiment, the surface of a cradle 108 may be recessed below the upper surface 107 of the deck 102 when the cradle 108 is in the collapsed configuration, such that the surface of the cradle 108 does not form part of a load carrying surface.

The wagon 100 is adapted to carry an intermodal container when the cradles are in the collapsed configuration. Intermodal containers are containers that can be used with various modes of transport. Intermodal containers are commonly referred to as shipping containers or ISO containers. Intermodal containers are available in standard sizes that have standard twistlock fittings for lifting and securing the containers. The fittings are typically spaced 8 ft (2.4 m) apart along the width of the container, and either 20 ft (6.1 m) or 40 ft (12.2 m) apart along the length of the container. The wagon 100 may also be adapted to carry other types of cargo that can be secured via fittings. For example, a barrel for transporting liquids may be mounted in a frame that has fittings for lifting and securing the frame. The fittings may be twistlock fittings and may have similar spacings to the fittings of an intermodal container.

Figure 1C:
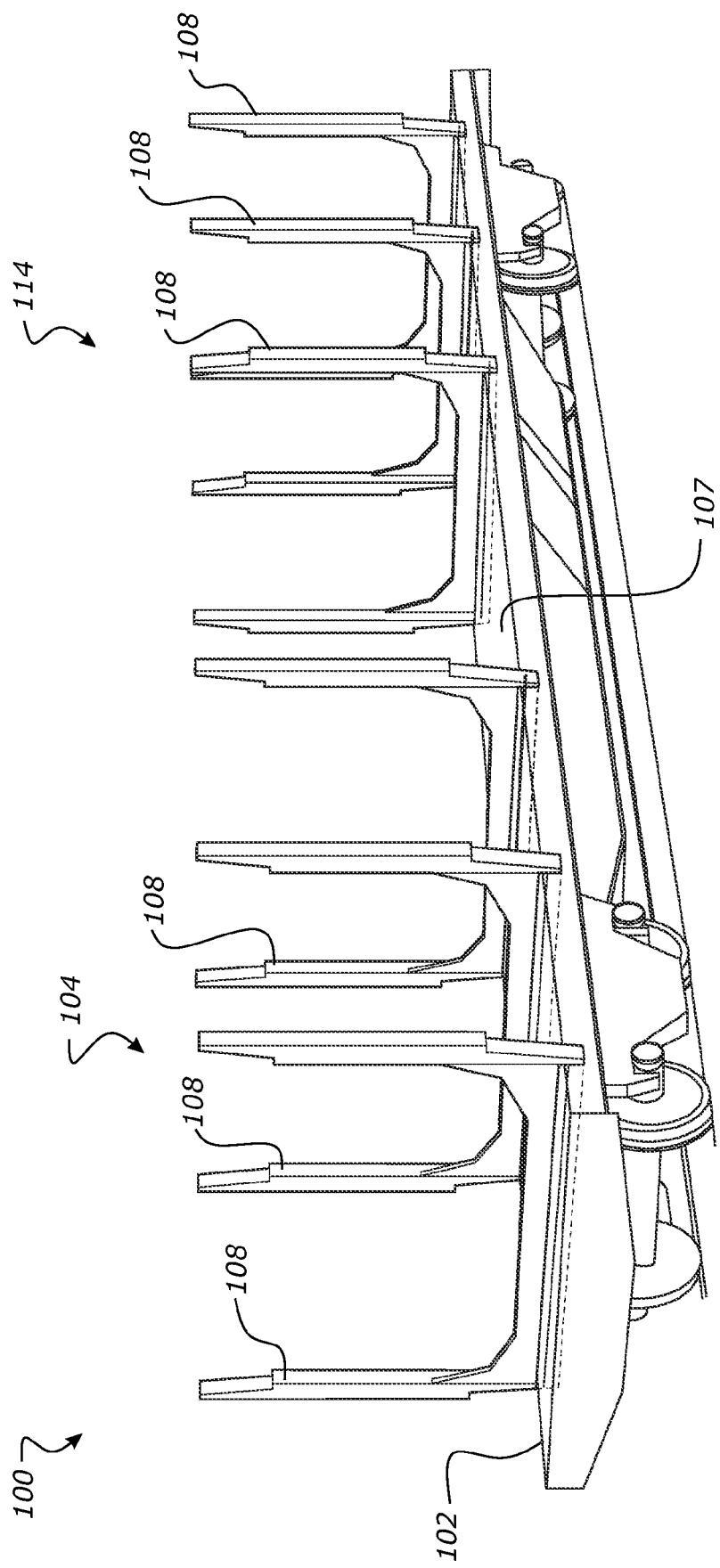
FIG. 1C shows the wagon of FIG. 1A, with all of the cradles in the extended configuration.

FIG. 1C shows the cradles 108 of the first group 104 and the second group 114 in the extended configuration. The cradles 108 extend at a transverse angle relative to the deck 102 in the extended configuration. In the embodiment shown, the cradles 108 extend at about 90° relative to the deck 102. In alternative embodiments, the cradles 108 may extend at any other suitable angle relative to the deck 102 in the extended configuration, for example, 75°, 80°, or 85°.

When the cradles 108 are in the extended configuration, the wagon 100 is adapted to carry elongate objects, such as logs, rails, pipes, or any other elongated cargo that requires vertical support whilst in transit.

Exemplary embodiments will now be described.

First Embodiment

Figure 2A:
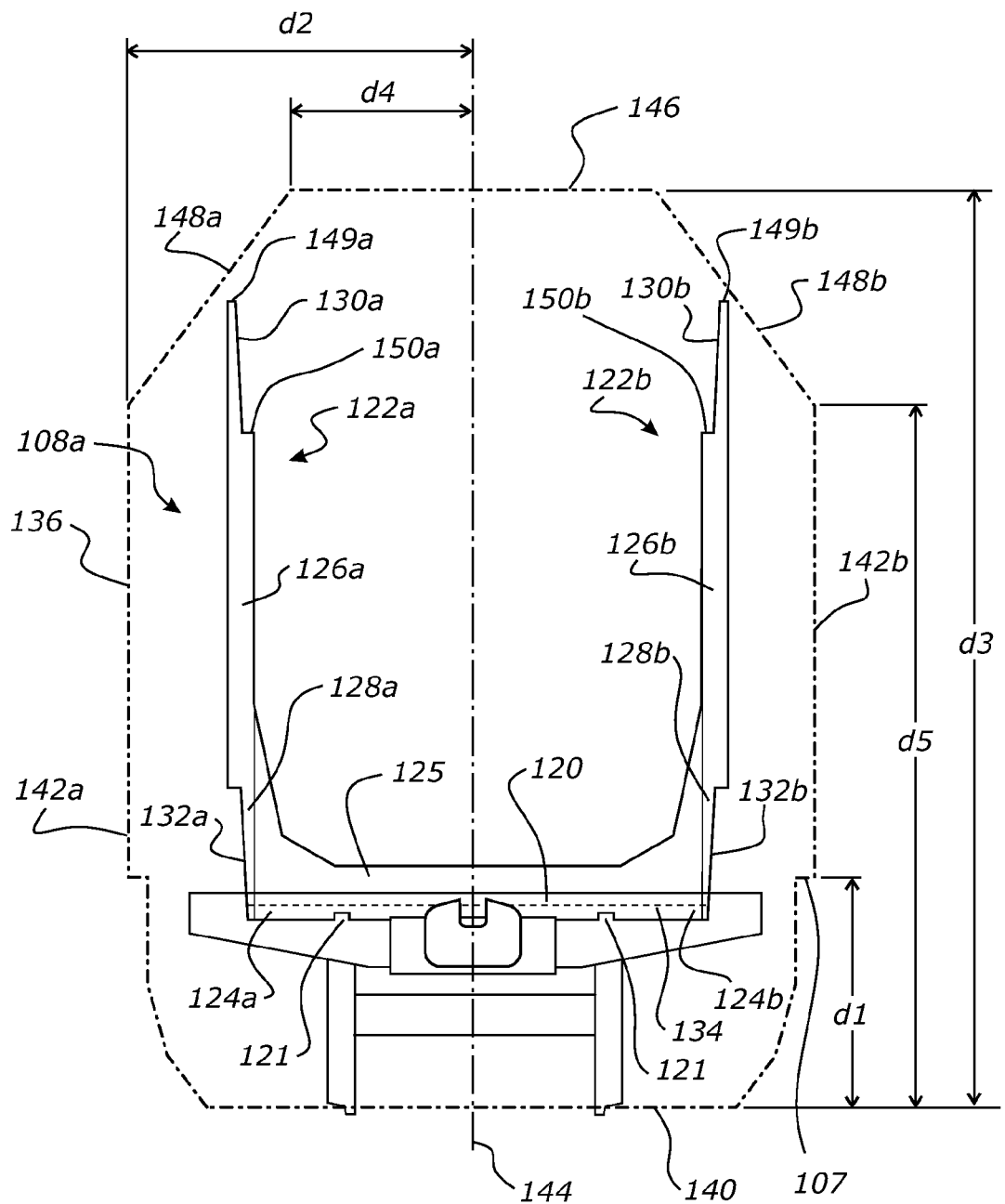
FIG. 2A shows a cross section of a cradle of a first embodiment wagon in the extended configuration.
Figure 2B:
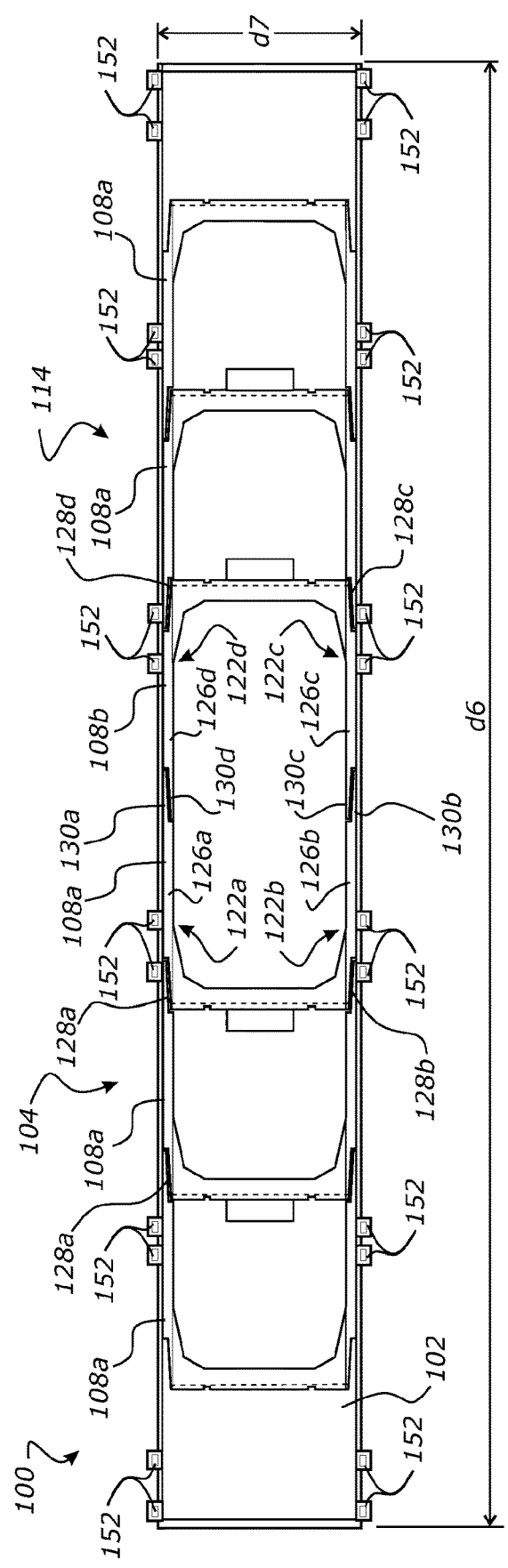
FIG. 2B shows a top view of the first embodiment wagon with the cradles in the collapsed configuration.
Figure 2C:
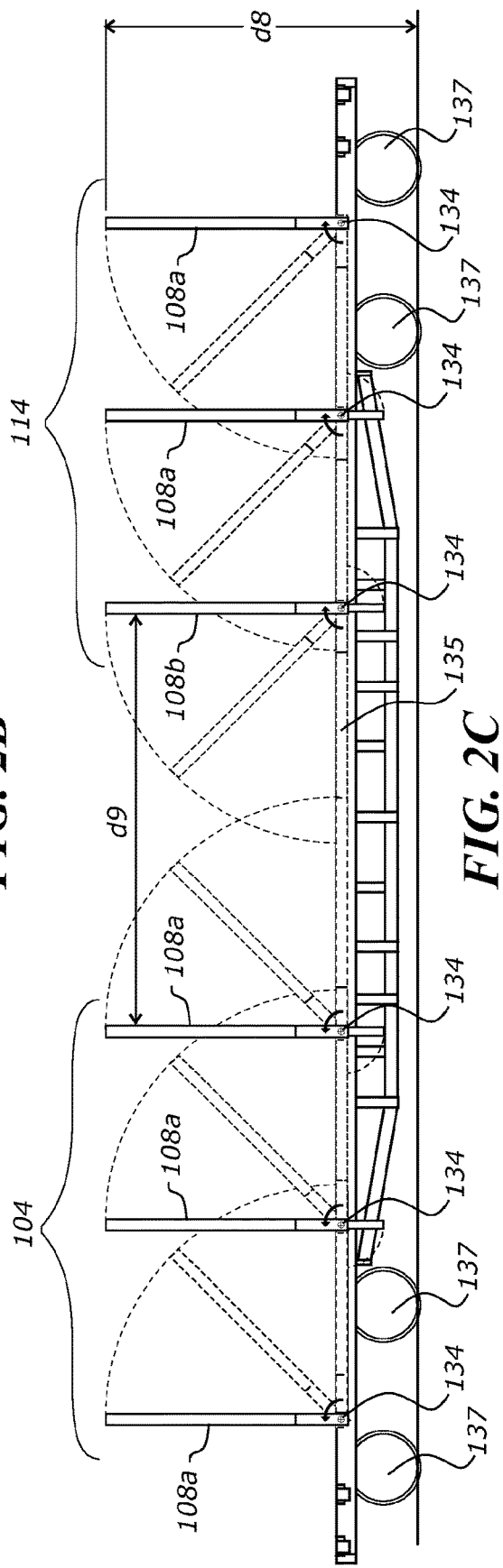
FIG. 2C shows a side view of the first embodiment wagon with the cradles pivoting from the collapsed configuration to the extended configuration.

FIGS. 2A-2C show a first embodiment of a wagon 100 for transporting cargo. The wagon 100 is adapted for use with a train.

In this embodiment, at least one cradle 108 has a base 120 and a first outwardly extending stanchion 122 at or near a first end 124a of the base 120. In the embodiment shown, the at least one cradle 108 has a second outwardly extending stanchion 126 at or near a second end 124b of the base 120.

FIG. 2A shows a cross section of a cradle 108a in the extended configuration. The cradle has a base 120, a first outwardly extending stanchion 122a at or near a first end 124a of the base 120, and a second outwardly extending stanchion 122b at or near a second end 124b of the base 120. In the embodiment shown, the base 120 has recesses 121 for housing gears 162 that are actuated by the actuator 106 (described in more detail below). In an alternative embodiment, the base 120 does not have recesses 121. The cradle 108a is adapted to pivot about a pivot axis 134. The pivot axis 134 passes through the base 120. In the embodiment shown, the stanchions 122a, 122b extend over the ends 124a, 124b of the base 120, such that the pivot axis 134 passes through the ends 128a, 128b of the stanchions. In an alternative embodiment, the stanchions 122a, 122b extend above the base 120, such that the pivot axis 134 does not pass through the ends 128a, 128b of the stanchions. In an alternative embodiment, the ends 128a, 128b of the stanchions extend below the base 120 (for example, see the second and third embodiments described below).

The base 120 may have any suitable cross section, such as a rectangular cross-section, a square cross-section, a triangular cross-section, or circular cross section. The base 120 may have one or more curved edges. FIG. 5A shows a base 120 having an exemplary profile.

In the embodiment shown, the cradle 108a has a gusset 125. The gusset 125 extends along the length of the base 120 and bridges the corners where the base 120 and the stanchions 122a, 122b meet. The gusset 125 may have any suitable shape. The gusset may strengthen the cradle structure. The gusset 125 is preferably shaped for receiving elongate objects in the cradle 108a. In the embodiments shown, the gusset 125 is adapted to carry elongate objects and elevate the elongate objects above the deck so that log grabs or forklift blades can slide underneath.

In the embodiment shown, the gusset 125 has a rectangular portion adjacent the base 120, and triangular portions at the corners where the base 120 and the stanchions 122a, 122b meet. In an alternative embodiment, the gusset 125 only has the rectangular portion. In an alternative embodiment, the gusset 125 has curved portions at the corners where the base 120 and the stanchions 122a, 122b meet. In a further alternative embodiment, the gusset 125 does not extend along the base 120, and the cradle 108a has two gussets, one in each the corners. In a further alternative embodiment, the gusset is integrally formed with the base 120 and/or stanchions 122a, 122b. In a further alternative embodiment, the cradle 108a does not have a gusset or gussets.

In the embodiment shown, the gusset 125 is formed from a single sheet of suitably strong metallic material. The gusset is flush with the stanchions 122a, 122b on one side of the cradle 108a. In the embodiment shown, the gusset 125 is flush with the stanchions 122a, 122b on the side of the cradle 108a that faces upwards when the cradle 108a is in the collapsed configuration, such that the gusset 125 is substantially flush with the upper surface 107 of the deck 102. This helps to minimise recesses in the deck 102 when the cradle 108a is in the collapsed configuration.

Each stanchion 122a, 122b has a body 126a, 126b with a first end 128a, 128b connected to the base 120, and a second end 130a, 130b. The first end 128a, 128b is fixed to the base 120. The second end 130a, 130b is a distal free end. In the embodiment shown, the two stanchions 122a, 122b are substantially parallel to each other, such that the cradle 108a is approximately 'U'-shaped. In some embodiments, the two stanchions 122a, 122b may extend at an angle relative to each other. For example, the stanchions 122a, 122b may extend at an angle of 5°, 10°, 15° or 20° relative to each other. The stanchions may have other shapes, for example, all or part of the stanchions 122a, 122b may be curved.

In the embodiment shown, the main part of the body 126a, 126b of each stanchion 122a, 122b has a substantially square cross-section. The body 126a, 126b may have any other suitable cross section, such as a rectangular cross-section, a triangular cross-section, or a circular cross-section. The body 126a, 126b may have one or more curved edges.

The free ends 130a, 130b of the stanchions 122a, 122b are adapted to nest with an adjacent cradle when the cradles are in the collapsed configuration. In this embodiment, the free ends 130a, 130b of the stanchions 122a, 122b are tapered. The tapered free ends 130a, 130b of the stanchions are adapted to nest with an adjacent cradle when the cradles are in the collapsed configuration. The tapered free ends 130a, 130b of the stanchions are adapted to nest with tapered free ends 130c, 130d of the stanchions of an adjacent cradle, and/or the fixed ends 128a, 128b of the stanchions of an adjacent cradle, and/or a base 120 of an adjacent cradle when the cradles are in the collapsed configuration. The fixed ends 128a, 128b of the stanchions have corresponding recesses 132a, 132b for nesting with tapered free ends of an adjacent cradle.

The tapered free ends 130a, 130b advantageously enable a greater cradle height for a given cradle spacing.

The cradle 108a may be adapted to pivot about pivot axis 134 using any suitable means. In the embodiment shown, the wagon 100 has a frame 135 located under the deck 102 that runs along a portion of the length of the wagon 100 and supports the deck 102. The frame 135 may comprise two parallel members that run along a portion of the length of the wagon 100. The members may be spaced apart by a distance that is less than the distance between the wheels 137 of the wagon 100. In a preferred embodiment, an axle is fixed to the frame 135 and the cradle 108*a* rotates about the axle. The axle is a single axle that passes through both of the parallel frame members. This embodiment may improve rigidity of the frame 135, but may make installation, maintenance and replacement of the cradle 108*a* relatively complex. In an embodiment, the axle comprises two halves, and each half extends outwardly from one of the parallel frame members. In another embodiment, an axle is fixed to the cradle 108*a* via the base 120. The cradle 108*a* and axle rotate as one on axleboxes inserted into and fixed to the wagon frame 135. This type of arrangement is well known to rail operators, and is commonly used with rolling stock. This embodiment may make installation, maintenance, and the replacement of the cradle easier, but the incision required to install the axleboxes may weaken the wagon frame 135 and may require additional strengthening.

The cradle 108*a* may be formed from any suitably strong and durable material. For example, the cradle 108*a* may be made from various types of steel or steel alloys. In an embodiment, the cradle 108*a* is made from carbon steel. In an embodiment, the cradle 108*a* is made from a steel-aluminum composite alloy. In an embodiment, the cradle 108*a* is coated in a suitable hard-wearing polymeric material. The cradle 108*a* may have a suitable surface treatment to reduce susceptibility to corrosion.

The cradle 108*a* is shaped and dimensioned to fit within a rail loading gauge 136 in the extended configuration. For example, the cradle 108*a* may be shaped and dimensioned to fit within a standardised rail loading gauge. A common rail loading gauge 136 in New Zealand has a wagon load platform 138 that is 910 mm above a rail level 140 (dimension d1), vertical sides 142*a*, 142*b* extending above the wagon load platform 138 and spaced 1415 mm on either side of a centreline 144 (dimension d2), a horizontal ceiling 146 that is 3800 mm above the rail level 140 (dimension d3), and angled portions 148*a*, 148*b* connecting the sides 142*a*, 142*b* and the ceiling 146, the angled portions 148*a*, 148*b* extending from 750 mm away from the centreline 144 (dimension d4) to 2900 mm above the rail level 140 (dimension d5).

FIG. 2B shows a top view of the wagon 100 with the cradles 108*a*, 108*b* in the collapsed configuration. FIG. 2C shows a side view of the cradles 108*a*, 108*b* pivoting from the collapsed configuration to the extended configuration. The cradles 108*a*, 108*b* are shown in solid lines in the extended configuration. The cradles 108*a*, 108*b* are shown in broken lines in the collapsed configuration. The cradles 108*a*, 108*b* are shown in broken lines at an intermediate position between the extended configuration and the collapsed configuration. The broken line curves indicate the semi-circular path that the cradles 108*a*, 108*b* travel through as they pivot from the collapsed configuration to the extended configuration and vice versa.

The deck 102 of the wagon may be about 15952 mm long (dimension d6) and about 2210 mm wide (dimension d7). This is a common wagon size in New Zealand. The wagon may be any other suitable size. The wagon is preferably at least as wide as an intermodal container.

In this embodiment, the cradles 108*a*, 108*b* have two different cradle profiles. All but one of the cradles are cradles 108*a* having a first profile. In the first profile, the outer surface of the tapered free end 130*a*, 130*b* of each stanchion 122*a*, 122*b* is an extension of the outer surface of the body 126*a*, 126*b* of the stanchion 122*a*, 122*b*. That is, the outer surface of the tapered free end 130*a*, 130*b* and the outer surface of the body 126*a*, 126*b* are co-planar. The inner surface of the tapered free end 130*a*, 130*b* of each stanchion 122*a*, 122*b* is angled relative to the inner surface of the body 126*a*, 126*b* of the stanchion 122*a*, 122*b*. In the embodiment shown, the tip 149*a*, 149*b* of the free end 130*a*, 130*b* is relatively flat. The stanchion 122*a*, 122*b* has a shoulder 150*a*, 150*b* where the tapered free end 130*a*, 130*b* meets the main part of the body 126*a*, 126*b*. The shoulder 150*a*, 150*b* is adapted to receive the fixed ends 128*a*, 128*b*, or tapered ends 130*c*, 130*d* of a stanchion of an adjacent cradle 108*a*, 108*b*.

In the embodiment shown, the two groups of stanchions 104, 114 pivot towards each other. Free ends 130*a*, 130*b* of the stanchions 122*a*, 122*b* of the innermost cradle of the first group 104 nest with free ends 130*c*, 130*d* of the stanchions 122*c*, 122*d* of the innermost cradle of the second group 114 in the collapsed configuration.

The innermost cradle of the first group 104 is a cradle 108*a* having the first profile. The innermost cradle of the second group 114 is a cradle 108*b* having a second profile. The tapered free ends 130*a*, 130*b* of the cradle 108*a* having the first profile are complementary with the tapered free ends 130*c*, 130*d* of the cradle 108*b* having the second profile. In the second profile, the inner surface of the tapered free end 130*c*, 130*d* of each stanchion 122*c*, 122*d* is an extension of the inner surface of the body 126*c*, 126*d* of the stanchion 122*c*, 122*d*. That is, the inner surface of the tapered free end 130*c*, 130*d* and the inner surface of the body 126*c*, 126*d* are co-planar. The outer surface of the tapered free end 130*c*, 130*d* of each stanchion 122*c*, 122*d* is angled relative to the outer surface of the body 126*c*, 126*d* of the stanchion 122*c*, 122*d*. The cradle 108*b* having the second profile is otherwise the same as the cradle 108*a* having the first profile. In an alternative embodiment, the innermost cradle of the first group 104 is a cradle 108*b* having the second profile, and the innermost cradle of the second group 114 is a cradle 108*a* having the first profile.

The deck 102 has fittings 152 for securing objects to the wagon. In the embodiment shown, the fittings are for securing an intermodal container to the wagon. The fittings may be standard twistlock fittings. In the embodiment shown, the fittings 152 are positioned at or near an edge of the deck 102. The fittings 152 are positioned further from a centreline of the deck 102 than the stanchions are. In alternative embodiments, such as embodiments having a wider deck 102, the fittings 152 may be positioned closer to a centreline of the deck 102 than the stanchions are. In an embodiment (described in more detail below), some or all of the fittings 152 may be mounted on, or integrally formed with, the cradles 108*a*, 108*b*. The locations of the fittings 152 may match those of a standard New Zealand flat deck railway wagon.

In this embodiment, the total height of the wagon 100 when the cradles are in the extended configuration may be about 3360 mm (dimension d8). There may be a spacing of about 4400 mm (dimension d9) between the innermost cradle of the first group and the innermost cradle of the second group in the extended configuration. The cradles 108*a*, 108*b* may have any other suitable dimensions. The cradles 108*a*, 108*b* are preferably shaped and dimensioned to fit within a standard rail loading gauge in the extended configuration.

Second Embodiment

Figure 3A:
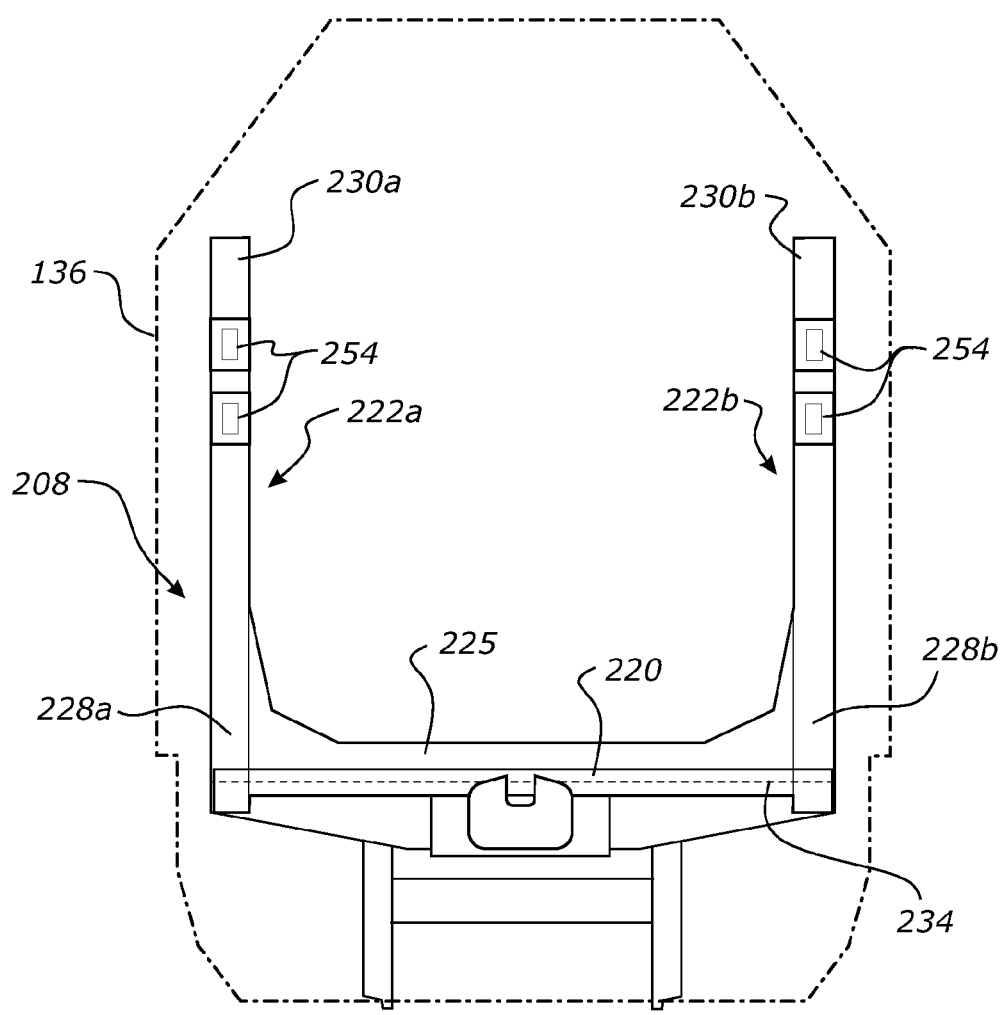
FIG. 3A shows a cross section of a cradle of a second embodiment wagon in the extended configuration.
Figure 3B:
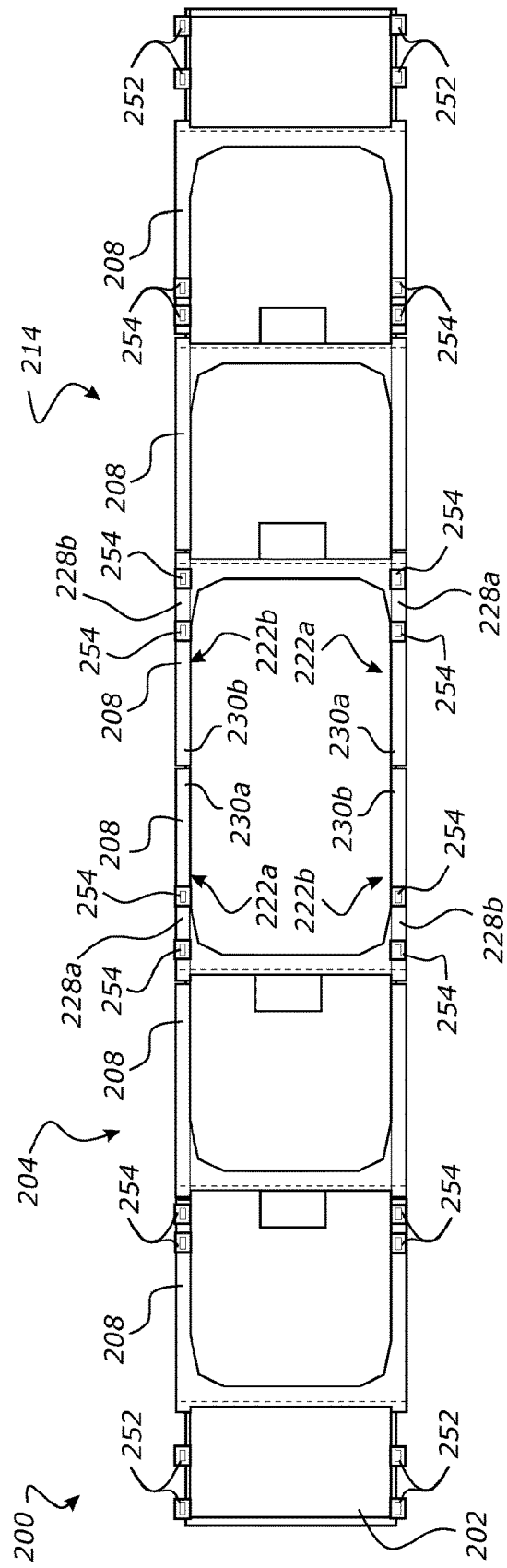
FIG. 3B shows a top view of the second embodiment wagon with the cradles in the collapsed configuration.
Figure 3C:
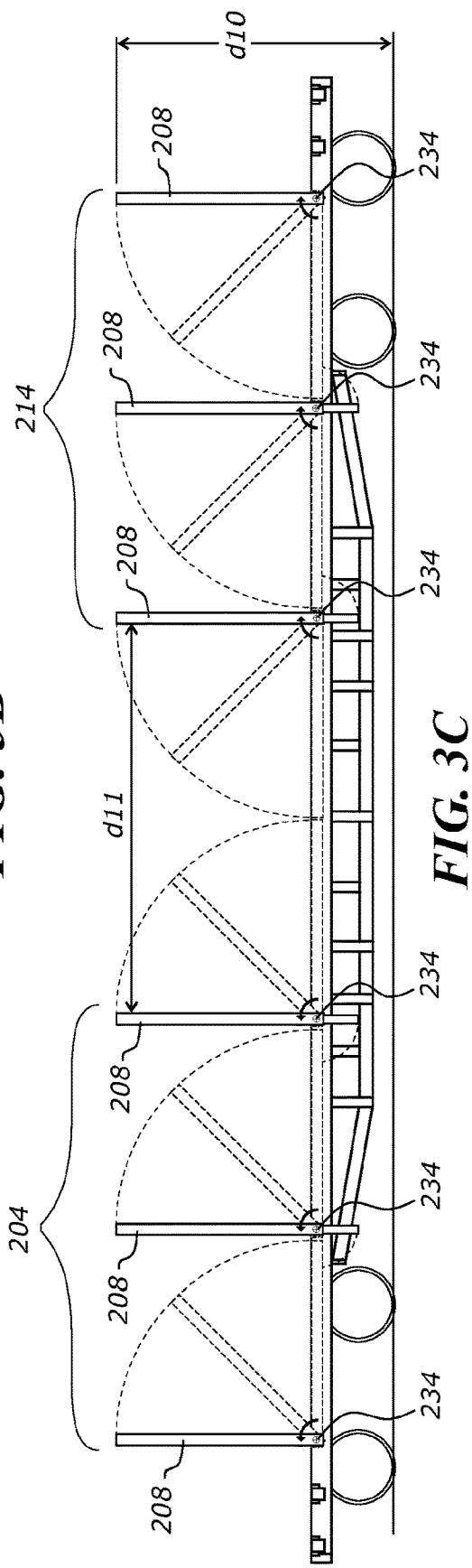
FIG. 3C shows a side view of the second embodiment wagon with the cradles pivoting from the collapsed configuration to the extended configuration.

FIGS. 3A-3C show a second embodiment of a wagon 200 for transporting cargo. The wagon 100 is adapted for use with a train. The second embodiment wagon 200 has similar features and functionality to the first embodiment wagon 100, except as described below. Like numbers indicate like parts, with the addition of 100.

FIG. 3A shows a cross section of a cradle 208 in the extended configuration. In this embodiment, the stanchions 222a, 222b do not have tapered free ends 230a, 230b.

The free ends 230a, 230b of the stanchions 222a, 222b are adapted to not overlap with an adjacent cradle 208 when the cradles 208 are in the collapsed configuration. The fixed ends 228a, 228b of the stanchions 222a, 222b do not have recesses for receiving ends of an adjacent cradle 208. The fixed ends 228a, 228b of the stanchions extend below the base 220. The base 220 does not have recess for housing gears. In an alternative embodiment, the cradle 208 has recesses for housing gears, similar to the cradles 108a, 108b of the first embodiment. In this embodiment, the fixed ends 228a, 228b of the stanchions may not extend below the base 220. This cradle 208 may be easier to manufacture than the cradles 108a, 108b of the first embodiment wagon 100 due to its simpler geometry.

The cradle 208 is illustrated in relation to the same rail loading gauge 136 as the loading gauge 136 of FIG. 2A. The cradle 208 of the second embodiment wagon 200 is wider and shorter than the cradle 108 of the first embodiment wagon 100. For the illustrated loading gauge 136, the maximum height of a wider cradle 208 is less than the maximum height of a narrower cradle 108 due to the geometry of the loading gauge 136.

FIG. 3B shows a top view of the wagon with the cradles 208 in the collapsed configuration. FIG. 3C shows a side view of the cradles 208 pivoting from the collapsed configuration to the extended configuration.

In this embodiment, all the cradles 208 have the same profile. At least one cradle 208 has fittings 254 for securing an intermodal container to the wagon 200. The fittings may be standard twistlock fittings. In the embodiment shown, the outer ends of the deck 202 also have fittings 252 for securing an intermodal container to the wagon. In some embodiments, the deck 202 does not have any fittings 252 for securing an intermodal container to the wagon. In an embodiment, the wagon 200 only has fittings 254 that are mounted on cradles 208.

In this embodiment, the total height of the wagon 200 when the cradles are in the extended configuration may be about 2950 mm (dimension d10). There may be a spacing of about 4150 mm (dimension d11) between the innermost cradle of the first group and the innermost cradle of the second group in the extended configuration. The cradles 208 may have any other suitable dimensions. The cradles 208 are preferably shaped and dimensioned to fit within a standard rail loading gauge in the extended configuration.

Third Embodiment

Figure 4A:
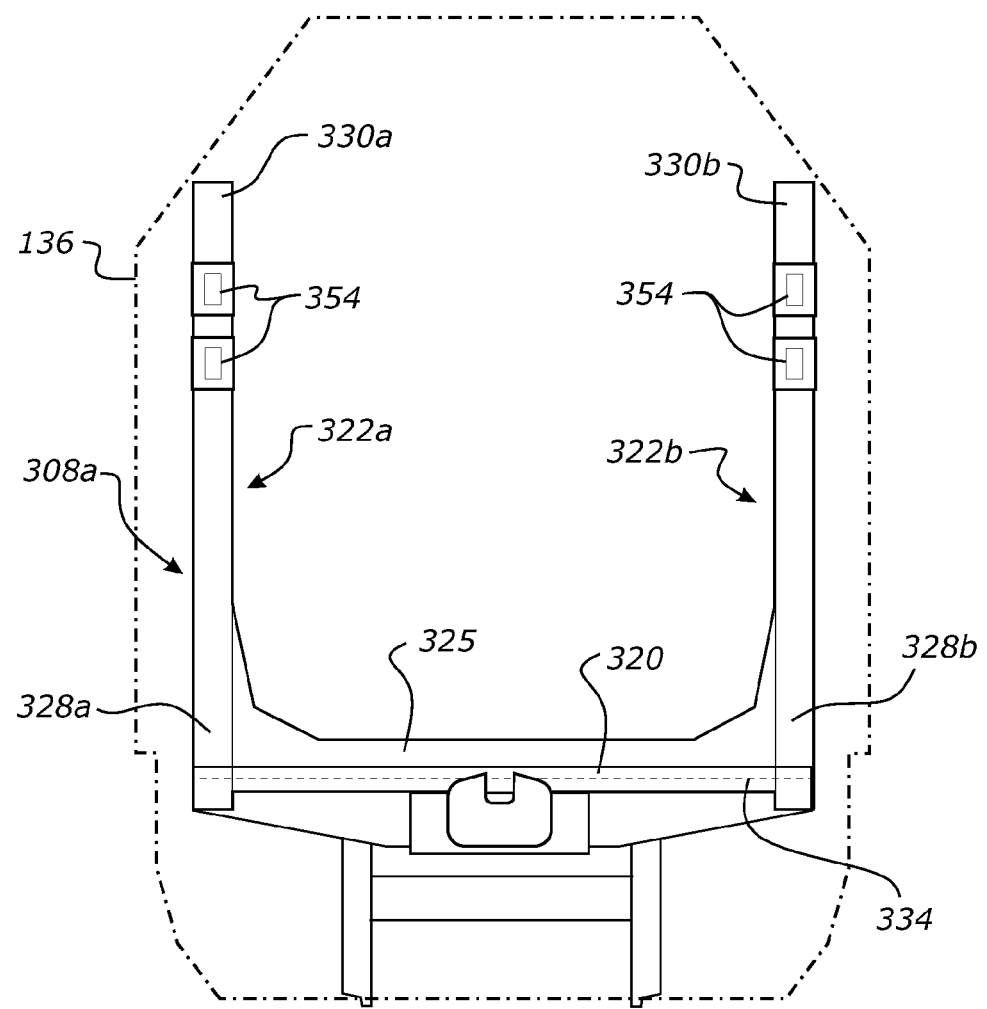
FIG. 4A shows a cross section of a cradle of a third embodiment wagon in the extended configuration.

FIGS. 4A-4C show a third embodiment of a wagon 300 for transporting cargo. The wagon 300 is adapted for use with a train. The third embodiment wagon 300 has similar features and functionality to the first embodiment wagon 100 and the second embodiment wagon 200, except as described below. Like numbers indicate like parts, with the addition of 200 and 100 respectively.

FIG. 4A shows a cross section of a cradle 308a in the extended configuration.

In this embodiment, free ends of some of the stanchion(s) are adapted to nest with an adjacent cradle when the cradles 308a, 308b, 308c are in the collapsed configuration. Free ends of at least some of the stanchions are tapered. The tapered free ends of the stanchions are adapted to nest with an adjacent cradle when the cradles are in the collapsed configuration. The fixed ends 328a, 328b of the stanchions extend below the base 320, similar to the cradles 208 of the second embodiment wagon 200.

In the embodiment shown, free ends 330c, 330d of the stanchions 322c, 322d of the innermost cradle of the first group 304 nest with free ends 330e, 330f of the stanchions 322e, 322f of the innermost cradle of the second group 314 in the collapsed configuration, similar to the innermost cradles of the first embodiment wagon 100. The free ends 330a, 330b of the remaining stanchions 322a, 322b are adapted to not overlap with an adjacent cradle 308a, 308b, 308c when the cradles 308a, 308b, 308c are in the collapsed configuration, similar to the cradles of the second embodiment wagon 200.

The cradle 308a is illustrated in relation to the same rail loading gauge 136 as the loading gauge of the first and second embodiments. The cradle 308a of the third embodiment wagon 300 is about the same width as the cradle 208 of the second embodiment wagon 200. The cradle 308a of the third embodiment wagon 300 is taller than the cradle 208 of the second embodiment wagon 200.

FIG. 4B shows a top view of the wagon with the cradles 308a, 308b, 308c in the collapsed configuration. FIG. 4C shows a side view of the cradles 308a, 308b, 308c pivoting from the collapsed configuration to the extended configuration.

In this embodiment, the cradles 308a, 308b, 308c have three different cradle profiles. All the cradles apart from the innermost cradles are cradles 308a having a first profile. The first profile is substantially the same as the profile of the cradle 208 of the second embodiment wagon 200.

The innermost cradle of the first group is a cradle 308b having a second profile. The second profile is similar to the first profile of the cradle 108a of the first embodiment wagon 100. In the embodiment shown, the fixed ends 328c, 328d of the stanchions 322c, 322d of the cradle 308b having the second profile do not have recesses for receiving ends of an adjacent cradle 308a, 308b, 303c. The innermost cradle of the second group 314 is a cradle 308c having a third profile. The third profile is similar to the second profile of the cradle 108b of the first embodiment wagon 100. In the embodiment shown, the fixed ends 328e, 328f of the stanchions 322e, 322f of the cradle 308c having the third profile do not have recesses for receiving ends of an adjacent cradle.

In the embodiment shown, the tapered free ends 330c, 330d, 330e, 330f of the stanchions 322c, 322d, 322e, 322f of the second cradle 308b and third cradle 308c are relatively longer compared with the tapered free ends 130a, 130b, 130c, 130d of the stanchions 122a, 122b, 122c, 122d of the first embodiment wagon 100. Longer tapered free ends advantageously enable a greater degree of overlap between the innermost cradle 308b of the first group and the innermost cradle 308c of the second group. This enables the innermost cradles 308b, 308c to be positioned closer together, which may be useful for carrying certain types of cargo.

The distance between the outermost cradles is substantially the same for the second embodiment wagon 200 and the third embodiment wagon 300. However, the stanchions 322a, 322b, 322c, 322d, 322e, 322f of the cradles 308a, 308b, 308c of the third embodiment wagon 300 can be made longer than the stanchions 222a, 222b of the cradles 208 of the second embodiment wagon 200. This is possible because the innermost cradles 308b, 308c are configured to overlap in the collapsed configuration, which enables them to be positioned closer together.

Similar to the second embodiment wagon 200, at least one cradle 308a, 308b, 308c has fittings 354 for securing an intermodal container to the wagon.

In this embodiment, the total height of the wagon 300 when the cradles are in the extended configuration may be about 3200 mm (dimension d12). There may be a spacing of about 3250 mm (dimension d13) between the innermost cradle of the first group and the innermost cradle of the second group in the extended configuration. The cradles 308a, 308b, 308c may have any other suitable dimensions. The cradles 308a, 308b, 308c are preferably shaped and dimensioned to fit within a standard rail loading gauge in the extended configuration.

The first, second, and third embodiment wagons 100, 200, 300 are exemplary embodiments for a railway wagon with a common New Zealand loading gauge and wagon size. The principles of the invention can be readily adapted to other loading gauges and for various desired characteristics of the wagon. In some embodiments, all the cradles 308 may fold in the same direction. In some embodiments, the stanchions are relatively short, such that there is a substantial gap between the free ends of the stanchions and the adjacent cradle in the collapsed configuration.

Factors that may influence the design include geometric constraints of the loading gauge, desired height of stanchions, desired width of cradles, and ease of manufacture.

In an embodiment, cradles are retrofit to existing flat deck wagons.

FIG. 5A and FIG. 5B show an exemplary actuator 106. The actuator 106 is illustrated in relation to the first group of cradles 104 of the first embodiment wagon 100. The actuator 106 may also be used to actuate the second group of cradles 114. The actuator 106 may be used to actuate any of the groups of cradles of any of the embodiments described herein.

In an embodiment, the actuator 106 comprises a worm drive. In the embodiment shown, the actuator comprises two worm drives 158a, 158b. In an alternative embodiment, the actuator may comprise a single worm drive. A single worm drive may extend along the centre of the deck. Referring to FIG. 5B, each worm drive 158a, 158b has threaded portions 160 that engage with gears 162 at the base 120 of the cradles 108a. In an alternative embodiment, a worm drive 158a, 158b is substantially continuously threaded.

In a preferred embodiment, the gears 162 are be mounted in recesses 121 in the base 120 of the cradle, as shown in relation to the first embodiment. Alternatively, the base 120 may not have recesses 121, and the gears 162 may be mounted directly to the base 120. In embodiments where the gears 162 are not housed in recesses 121, the depth of the base 120 may need to be reduced to provide sufficient clearance for the threaded portions 160 to engage with the gears 162 through the full range of movement of the cradle 108a. In embodiments where the gears 162 are not housed in recesses 121, the ends 128a, 128b of the stanchions may extend below the base 120. The ends 128a, 128b of the stanchions extending below the base 120 may provide an engagement surface for engaging with stop blocks 166 (described in more detail below).

The first worm drive 158a engages with gears 162 located at the first end 124a of the base 120 of each cradle 108a in the group. The second worm drive 158b engages with gears 162 located at a second end 124b of the base 120 of each cradle 108a, 108b in the group.

The worm drives may be operably connected such that they are operated by a shared energy source, for example via a suitable mechanical connection. Alternatively, each worm drive may be operated by a separate energy source. The separate energy sources may be controlled by a controller so that they operate in unison. In an embodiment, the actuator(s) is/are manually operable. In an embodiment, the actuator(s) is/are pneumatically operable. In an embodiment, the actuator(s) is/are hydraulically operable. In an embodiment, the actuator(s) comprise(s) at least one hydraulic ram. Pneumatic operation may be particularly suitable for train wagons, as train wagons commonly have an air supply for use in the braking system. In an embodiment, the actuators) are operable by a motor powered by any source.

In the embodiment shown, the worm drives 158a, 158b are actuated via manually operable handles 161. The handles 161 are located at either end of a drive shaft 163. The drive shaft 163 is connected to the worm drives 158a, 158b via bevel gears 165. A user may actuate the group of cradles 104 by manually operating either of the handles 161. This arrangement advantageously enables a user to actuate the group of cradles 104 from either side of the wagon 100. Similar arrangements may be utilised for any non-manual actuation means. In an embodiment, a non-manual actuation means, such as a motor, is located centrally on the shaft 163. One or more controllers for the actuation means may be located at any suitable location. For example, controllers for the actuation means may be located at similar locations to the location of the handles 161 in FIG. 5A, to enable a user to control the actuation means from either side of the wagon 100.

In an embodiment, at least one cradle 108a, 108b has a biasing mechanism for biasing the cradle 108a, 108b towards the extended configuration. In the embodiment shown, the biasing mechanism is a counterweight 164. The counterweight 164 biases the cradle 108a, 108b towards the extended configuration, in alternative embodiments, the biasing mechanism may be any suitable biasing device, such as a spring device.

In an embodiment, all of the cradles 108a, 108b have a biasing mechanism. In an embodiment, all of the cradles 108a, 108b have a counterweight 164. In an embodiment, the outermost cradles 108a, 108b do not have a counterweight 164. In some wagon arrangements, it may not be possible to have a counterweight 164 on the outermost cradles due to the location of the wagon bogies. In some embodiments, a cradle that does not have a counterweight is mechanically linked to an adjacent cradle that has a counterweight, such that counterweight biases both cradles towards the extended configuration.

In the embodiment shown, the wagon 100 has stop blocks 166 that prevent the cradles 108a, 108b from rotating past the desired angular orientation in the extended configuration. The stop blocks 166 engage with the ends 128a, 128b of the stanchions, and may also engage with a portion of the base 120. The cradles 108a, 108b may rest on the stop blocks 166 when the cradles are in the collapsed configuration. The stop blocks 166 may prevent the cradles 108a, 108b from rotating past the desired angular orientation in which the cradles 108a, 108b are substantially flush with the upper surface 107 of the deck 102 in the collapsed configuration.

In an embodiment, the wagon 100 has one or more locking devices (not illustrated) to lock the cradles 108a, 108b in the extended configuration and/or the collapsed configuration. The locking devices may have any suitable form. For example, the locking devices may comprise one or more moveable pins mounted to the wagon frame 135 and/or deck 102 that are adapted to selectively engage with suitable apertures in the cradles 108a, 108b. The locking devices may be spring loaded. The locking devices may be adapted to lock the cradles in the collapsed configuration, or the extended configuration, or both. The locking devices may be manually operable. The locking devices may be operable by a motor or any other suitable actuation means. A cradle 108a, 108b may have a single associated locking device. A cradle 108a, 108b may have two associated locking devices located on either side of the cradle.

Figure 6C:
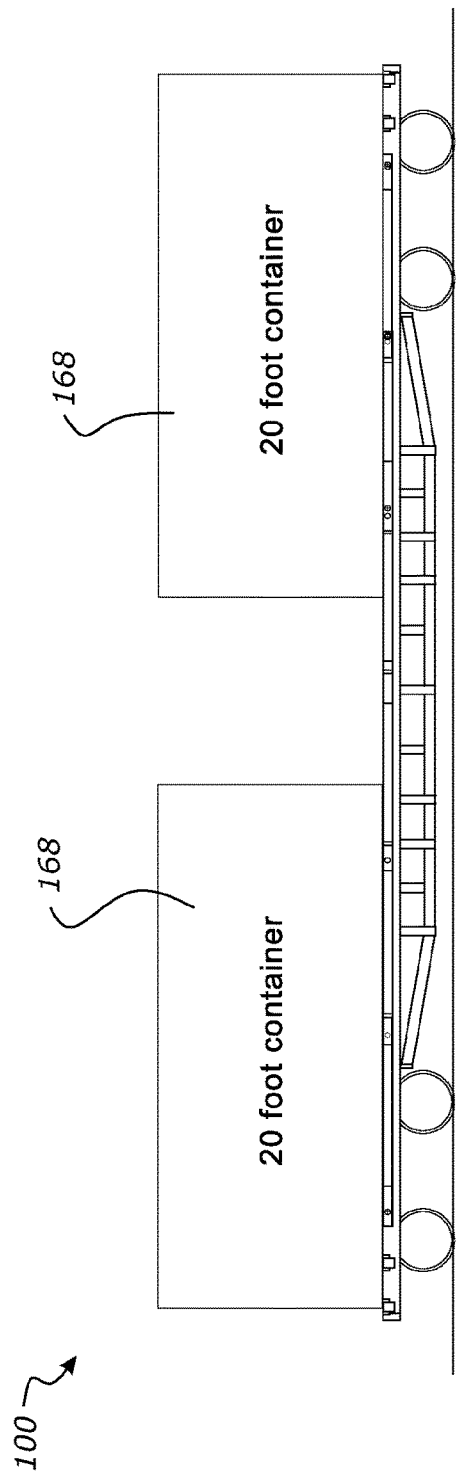

FIGS. 6A-6H show various cargo arrangements that can be transported by the wagon 100. The cargo arrangements are illustrated in relation to the first embodiment wagon 100. The cargo arrangements may be carried by the second embodiment wagon 200 and the third embodiment wagon 300. FIGS. 6A-6C show the wagon 100 with the first group of cradles 104 and the second group of cradles 114 in the collapsed configuration. FIG. 6B shows the wagon carrying a single 20 foot container 168. FIG. 6C shows the wagon 100 carrying two 20 foot containers 168. In an embodiment, the wagon 100 may carry a single 40 foot container (not illustrated).

Figure 6D:
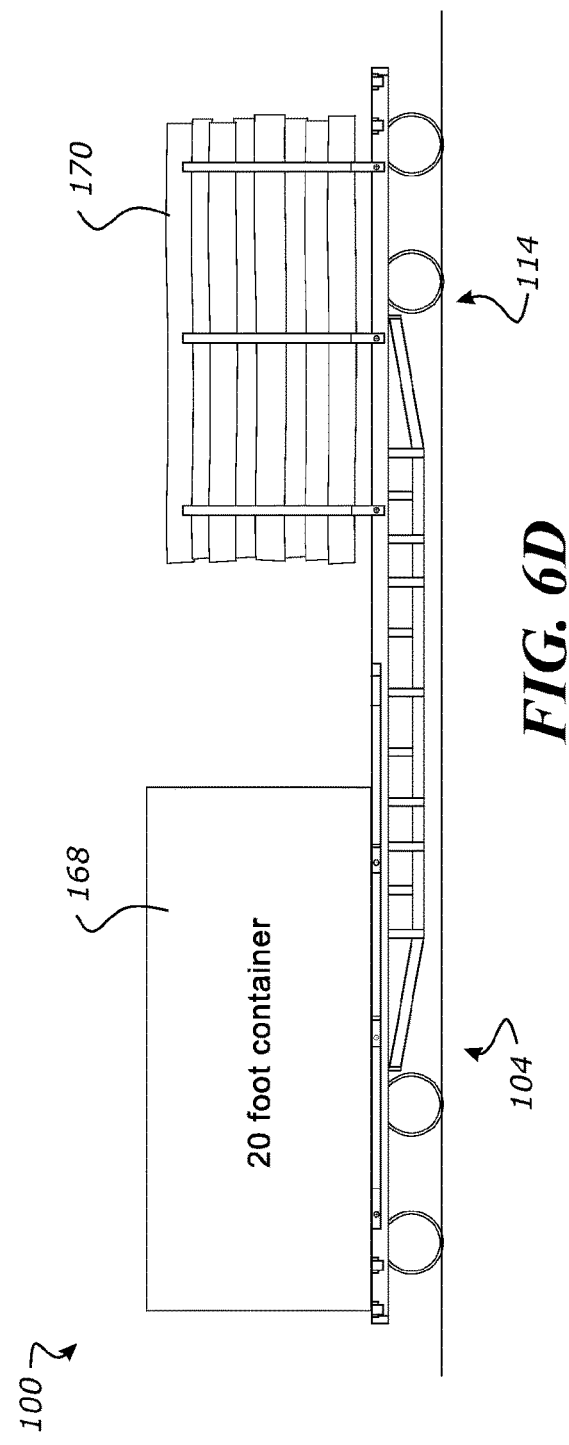

FIG. 6D shows the wagon 100 with the first group of cradles 104 in the collapsed configuration and the second group of cradles 114 in the extended configuration. In this configuration, the wagon 100 may carry a 20 foot container 163 and a plurality of logs 170 or other elongate objects.

Figure 6E:
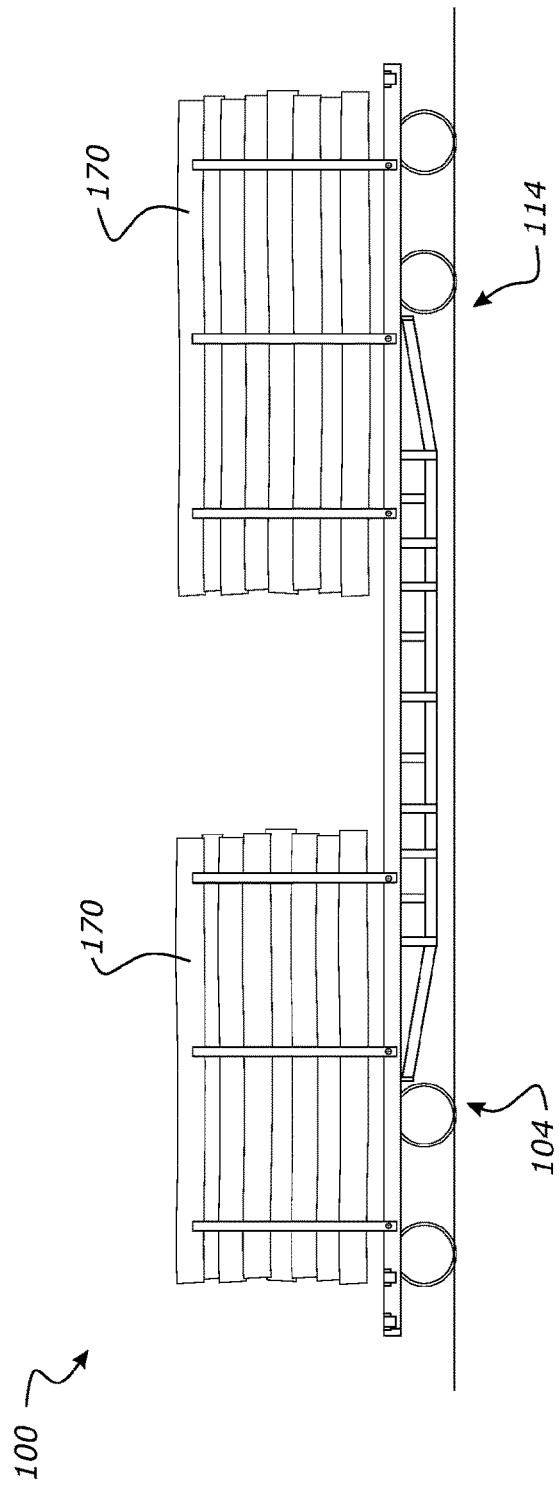
Figure 6F:
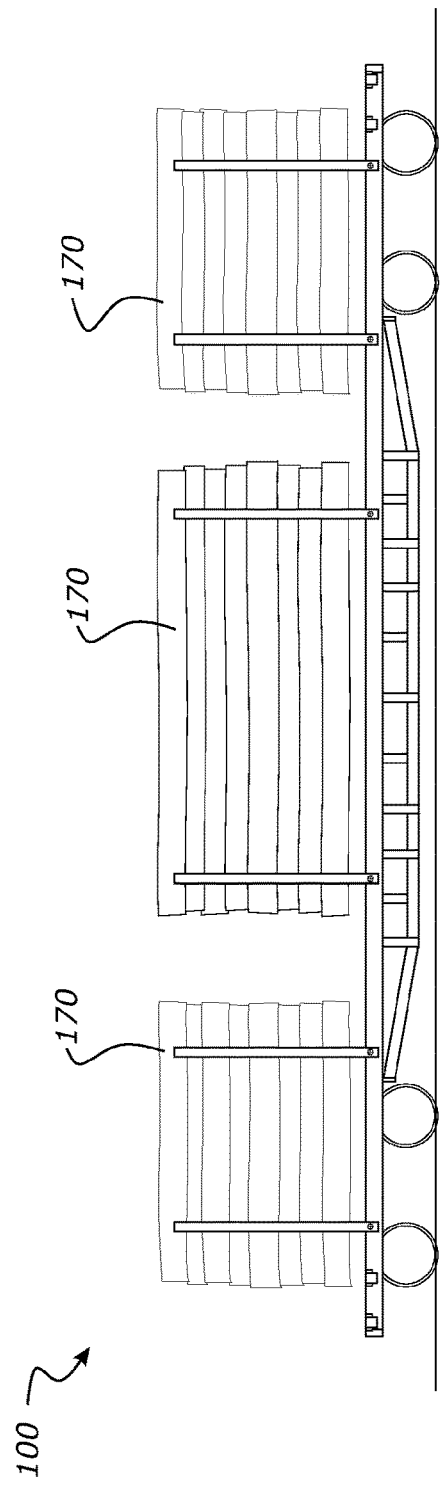
Figure 6G:
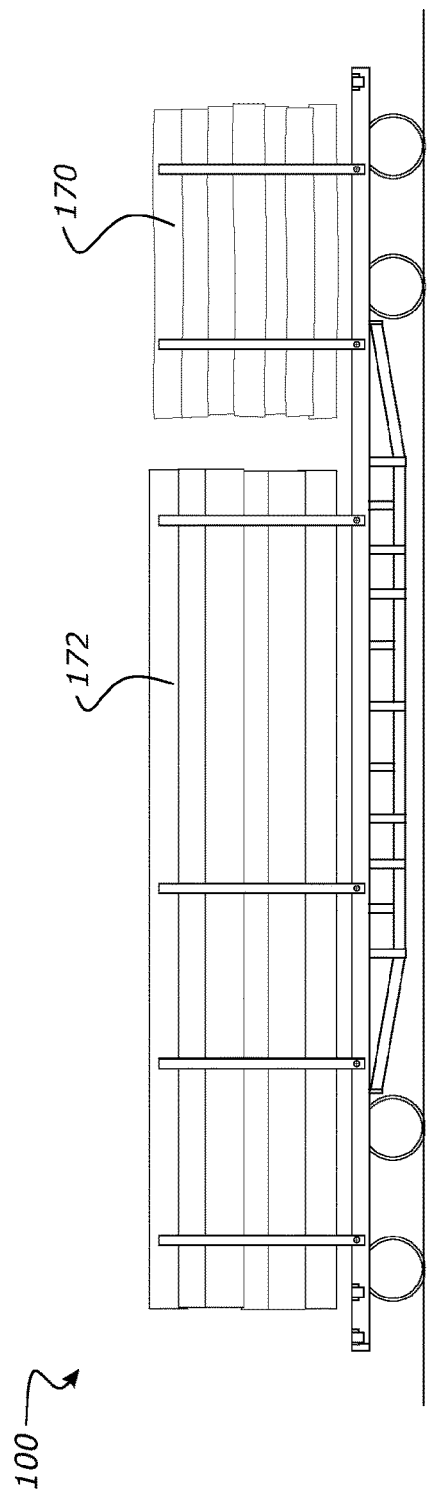
Figure 6H:
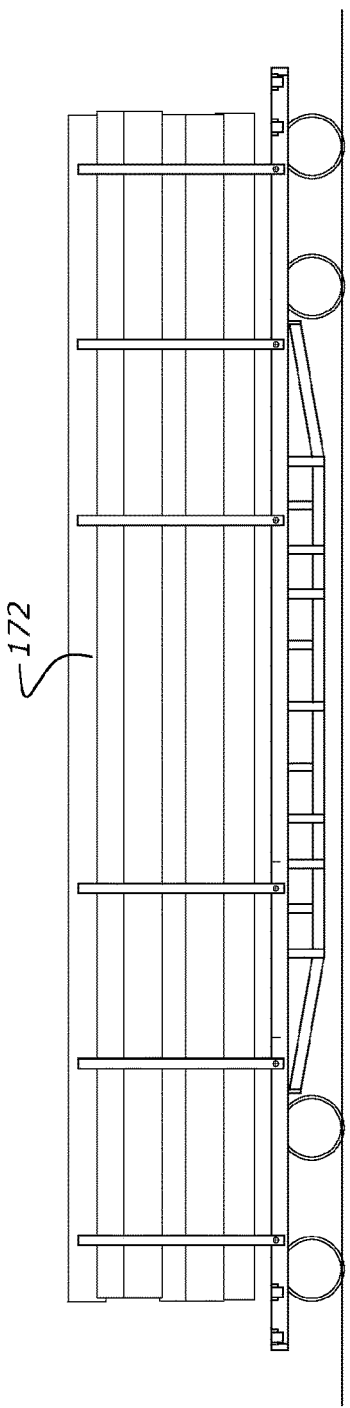

FIGS. 6E-6H show the wagon 100 with the first group of cradles 104 and the second group of cradles 114 in the extended configuration. FIG. 6E shows the wagon 100 carrying two groups of logs 170. FIG. 6F shows the wagon 100 carrying three groups of logs 170. FIG. 6G shows the wagon 100 carrying a relatively long group of pipes 172, and a relatively short group of logs 170. FIG. 6H shows the wagon 100 carrying a single, relatively long, group of pipes 172.

These cargo arrangements are illustrated for example only, and it will be appreciated that many other cargo arrangements are possible.

Figure 7A:
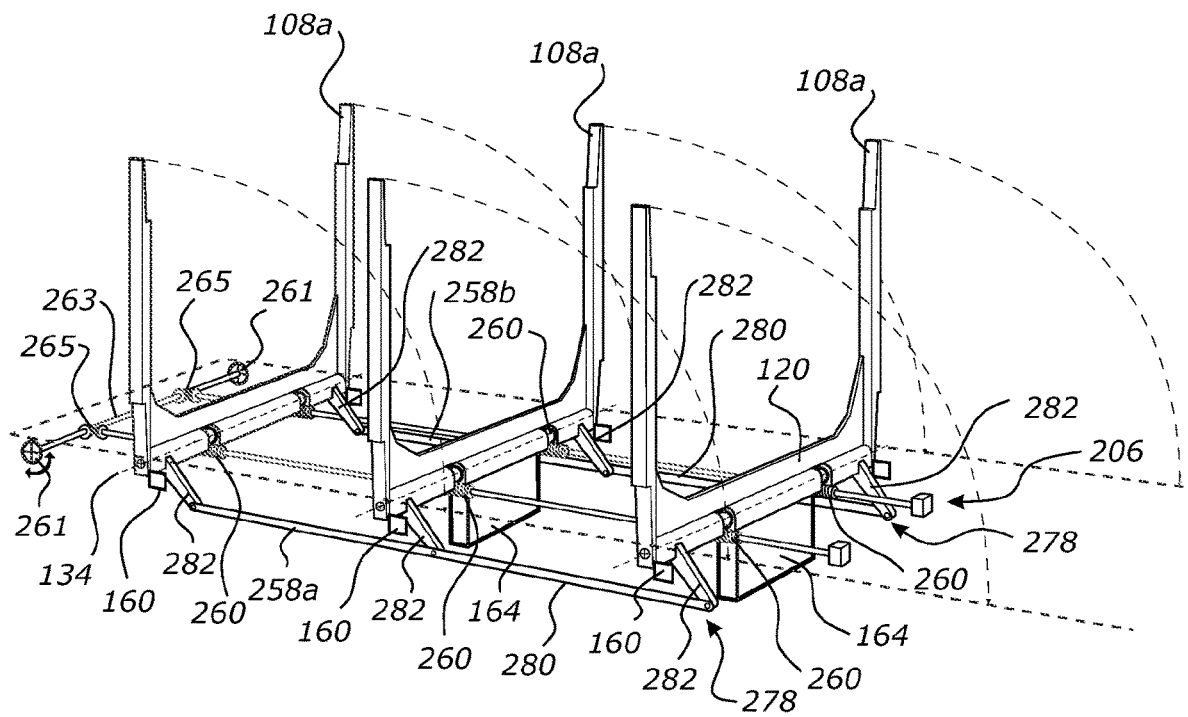
FIG. 7A shows a perspective view of another exemplary actuator.
Figure 7B:
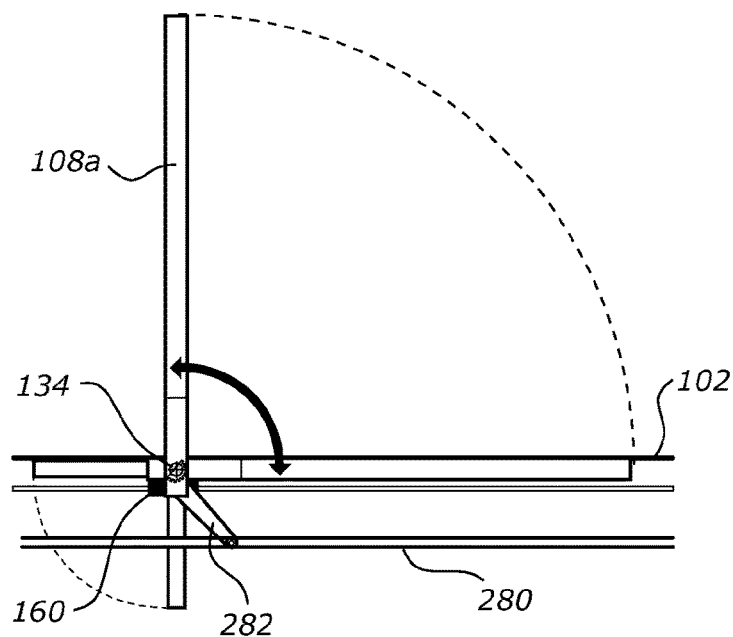
FIG. 7B shows a side view of a portion of the exemplary actuator of FIG. 7A.

FIG. 7A and FIG. 7B show another exemplary actuator 206. The actuator 206 is illustrated in relation to the first group of cradles 104 of the first embodiment wagon 100. The actuator 206 may also be used to actuate the second group of cradles 114. The actuator 206 may be used to actuate any of the groups of cradles of any of the embodiments described herein. This embodiment of the actuator has similar features and functionality to the first embodiment actuator 106, except as described below. Like numbers indicate like parts, with the addition of 100.

In the embodiment shown, the actuator 206 comprises a worm drive. FIG. 7A shows the actuator comprising two worm drives 258a, 258b. The worm drives 258a, 258b are spaced inwardly from the sides of the base 120 of each cradle 114, close to the counterweight 164. In addition to the actuator 206, there is also provided a pair of cradle linkage assemblies 278. Each cradle linkage assembly 278 comprises a main arm 290 that extends parallel to the worm drives 258a, 258b and/or the flat deck. Each cradle linkage assembly 278 further composes a plurality of linkage arms 282. Each cradle 104 has an associate linking arm 282. Each linking arm 282 is non-rotatably fixed to an associated cradle 104 and pivotally fixed to the main arm 280. The pair of cradle linkage assemblies 278 ensure movement of the cradles is synchronised and the cradles 104 move together.

In an alternative embodiment, the actuator may comprise a single worm drive and/or a single cradle linkage assembly 278.

Similar to the embodiment of FIGS. 5A and 5B, the worm drives 258a, 258b are actuated via manually operable handles 261 located at either end of a drive shaft 263, which is connected to the worm drives 258a, 258b via bevel gears 265. A user may actuate the group of cradles 104 by manually operating either of the handles 261. Alternatively, a non-manual actuation means, such as a motor, may operate the shaft 263.

Figure 8A:
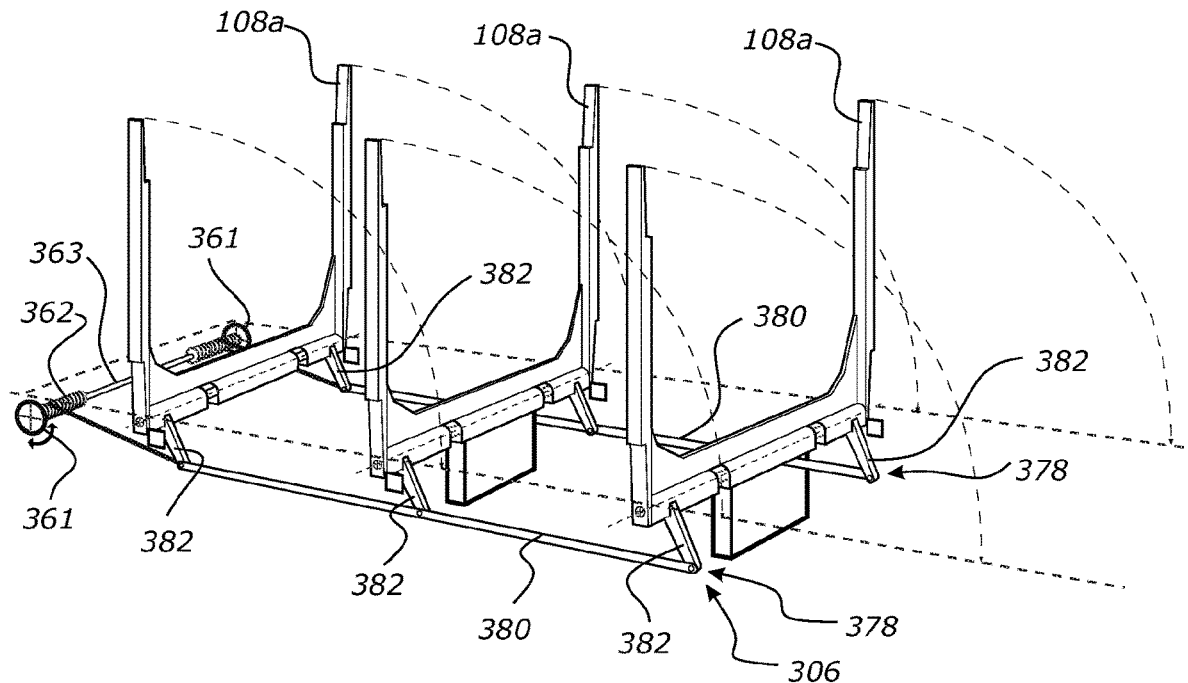
FIG. 8A shows a perspective view of a further exemplary actuator.
Figure 8B:
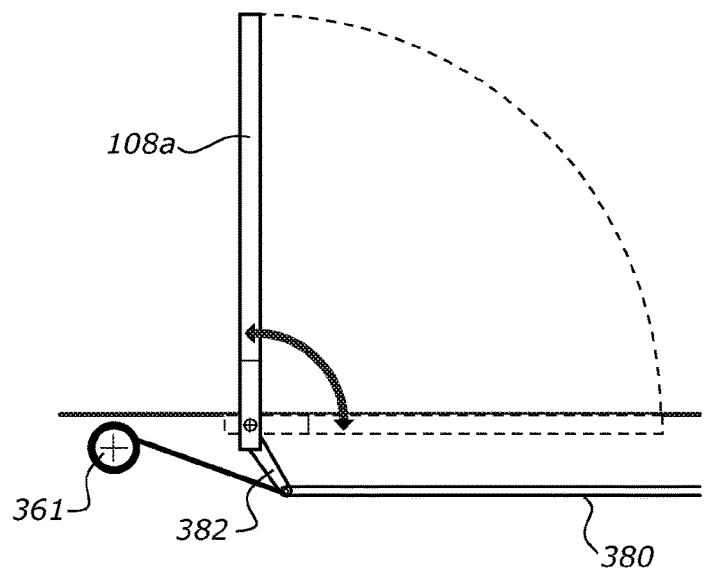
FIG. 8B shows a side view of a portion of the exemplary actuator of FIG. 8A.

FIG. 8A and FIG. 8B show another exemplary actuator 306. The actuator 306 is illustrated in relation to the first group of cradles 104 of the first embodiment wagon 100. The actuator 306 may also be used to actuate the second group of cradles 114. The actuator 306 may be used to actuate any of the groups of cradles of any of the embodiments described herein.

In the embodiment shown, the actuator 306 comprises a pair of cradle linkage assemblies. Each cradle linkage assembly comprises a main arm that extends parallel to the flat deck. Each cradle linkage further comprises a plurality of linkage arms. Each cradle has an associate linkage arm. Each linkage arm is non-rotatably fixed to an associated cradle and pivotally fixed to the main arm. The pair of cradle linkage assemblies ensure movement of the cradles is synchronised and the cradles 104 move together. Movement of the linkage assemblies is controlled by manually operable handles 361 located at either end of a drive shaft 363. The drive shaft 363 is connected to the cradle linkage assemblies via a cable. The cable is preferably formed from a suitable material such as stainless-steel cable. As the handles are operated, the cable is wound onto a spool. The spool is shown to have an externally threaded profile to receive the cable. Alternatively, the external surface may be non-threaded or smooth. A user may actuate the group of cradles 104 by manually operating either of the handles 361. Alternatively, a non-manual actuation means, such as a motor, may operate the shaft 363.

In an alternative embodiment, the actuator may comprise a single cradle linkage assembly.

Truck Embodiment

Figure 9:
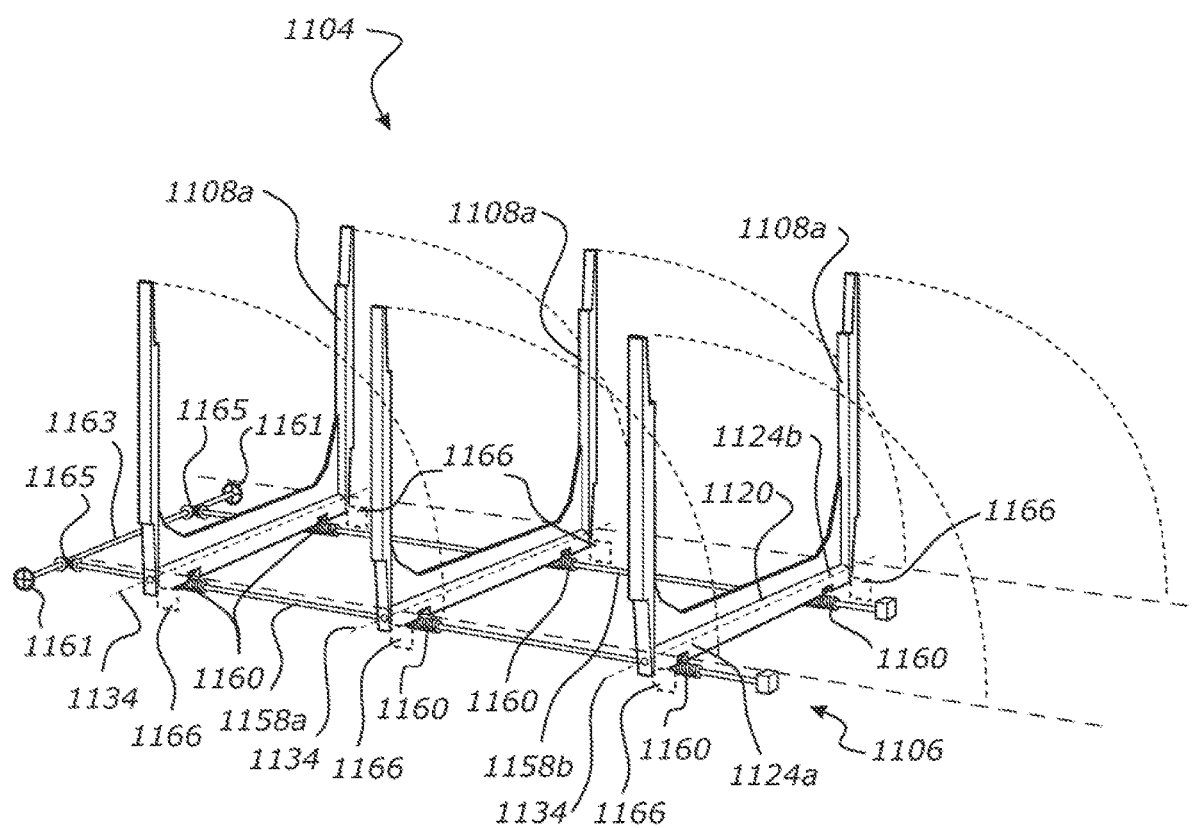

The above embodiments are adapted for use with a railway wagon. It will be appreciated that the principles of the invention described above may be applied to other forms of transport. In some embodiments, the vehicle is a truck, part of a truck, or a device or apparatus for use with a truck. For example, the vehicle may be a trailer. FIG. 9 shows a group of cradles 1104 and actuator 1106 adapted for use with a truck. The truck embodiment has similar features and functionality to the first embodiment wagon 100, except as described below. Like numbers indicate like parts, with the addition of 1000.

Weight may be of greater concern for trucks than train wagons. In an exemplary arrangement for a truck, the cradles 1104 do not have counterweights to reduce weight. The cradles 1104 may be biased towards the extended configuration using a spring mechanism. In the embodiment of FIG. 9, the cradles 1104 do not have a biasing mechanism.

In the embodiment of FIG. 9, the actuator 1106 comprises two worm drives 1158a, 1158b having similar features and functions to the first embodiment. Trucks generally have a source of electrical power. An exemplary arrangement for a truck may have cradles 1104 that are hydraulically operated. Hydraulic rams may be operated electronically.

In a preferred embodiment, a trailer for a truck, or the truck itself, has two groups of cradles 1104 that pivot towards each other, similar to the exemplary embodiments described above in relation to railway wagons. In an embodiment, a truck, or trailer for a truck, has a plurality of cradles that pivot in the same direction.

Preferred embodiments of the invention have been described by way of example only and modifications may be made thereto without departing from the scope of the invention.

The invention claimed is:

1. A vehicle for transporting cargo, comprising:
   a deck with a frame and an upper surface, the frame being located under the deck and supporting the deck;
   a group of cradles, each cradle in the group being pivotable relative to the deck between an extended configuration in which the cradles extend at a transverse angle relative to the deck, and a collapsed configuration in which the cradles are substantially flush with the deck; and
   an actuator adapted to concurrently pivot two or more cradles in the group between the extended configuration and the collapsed configuration such that the two or more cradles in the group will extend at the same angle relative to the deck at any point in time.

2. The vehicle according to claim 1, wherein the group of cradles comprises at least two cradles.

3. The vehicle according to claim 1, wherein the group of cradles comprises at least three cradles.

4. The vehicle according to claim 1, wherein the group is a first group and the actuator is a first actuator, the vehicle further comprising:
   a second group of cradles, each cradle in the second group being pivotable relative to the deck between an extended configuration in which the cradles extend at a transverse angle relative to the deck, and a collapsed configuration in which the cradles are substantially flush with the deck; and
   a second actuator adapted to concurrently pivot two or more cradles in the second group between the extended configuration and the collapsed configuration.

5. The vehicle according to claim 4, wherein the second group of cradles comprises at least two cradles.

6. The vehicle according to claim 4, wherein the second group of cradles comprises at least three cradles.

7. The vehicle according to claim 1, wherein at least one cradle comprises a base and a first outwardly extending stanchion at or near a first end of the base.

8. The vehicle according to claim 7, wherein the at least one cradle comprises a second outwardly extending stanchion at or near a second end of the base.

9. The vehicle according to claim 7, wherein free ends of the stanchion(s) of at least one cradle are adapted to nest with an adjacent cradle when the cradles are in the collapsed configuration.

10. The vehicle according to claim 9, wherein the free ends of at least some of the stanchions are tapered.

11. The vehicle according to claim 1, wherein the vehicle is adapted to carry elongate objects when the cradles are in the extended configuration.

12. The vehicle according to claim 1, wherein the vehicle is adapted to carry an intermodal container when the cradles are in the collapsed configuration.

13. The vehicle according to claim 12, wherein at least one cradle comprises fittings for securing an intermodal container to the vehicle.

14. The vehicle according to claim 12, wherein the deck comprises fittings for securing an intermodal container to the vehicle.

15. The vehicle according claim 1, wherein at least one cradle further comprises a biasing mechanism for biasing the cradle towards the extended configuration.

16. The vehicle according to claim 15, wherein the biasing mechanism comprises a counterweight.

17. The vehicle according to claim 1, wherein the actuator comprises a worm drive.

18. The vehicle according claim 1, wherein the actuator is manually operable, pneumatically operable, and/or hydraulically operable.

19. The vehicle according to claim 1, wherein the vehicle is a train, a wagon adapted for use with a train, a truck, or a wagon adapted for use with a truck.

20. The vehicle according to claim 19, wherein the cradles are shaped and dimensioned to fit within a rail loading gauge in the extended configuration, the rail loading gauge having a vehicle load platform 910 mm above a rail level, vertical sides extending above the vehicle load platform spaced 1415 mm on either side of a centreline, a horizontal ceiling 3800 mm above the rail level, and angled portions connecting the sides and the ceiling, the angled portions extending from 750 mm from the centreline to 2900 mm above the rail level.

* * * * *